US010004090B2

(12) United States Patent
Zhao et al.

(10) Patent No.: US 10,004,090 B2
(45) Date of Patent: *Jun. 19, 2018

(54) QUEUE-BASED MAC PROTOCOL WITH SUBCARRIER ALLOCATION OPTIMIZATION

(71) Applicant: Macau University of Science and Technology, Macau (MO)

(72) Inventors: Qinglin Zhao, Macau (MO); Fangxin Xu, Macau (MO); Yu Zeng, Macau (MO); Jie Yang, Macau (MO)

(73) Assignee: Macau University of Science and Technology, Macau (MO)

( * ) Notice: Subject to any disclaimer, the term of this patent is extended or adjusted under 35 U.S.C. 154(b) by 111 days.

This patent is subject to a terminal disclaimer.

(21) Appl. No.: 15/153,748

(22) Filed: May 13, 2016

(65) Prior Publication Data

US 2017/0019922 A1    Jan. 19, 2017

Related U.S. Application Data

(63) Continuation of application No. 14/828,159, filed on Aug. 17, 2015.

(Continued)

(51) Int. Cl.
    *H04W 74/08*    (2009.01)
    *H04W 74/00*    (2009.01)
    *H04W 74/02*    (2009.01)

(52) U.S. Cl.
    CPC ..... *H04W 74/0866* (2013.01); *H04W 74/008* (2013.01); *H04W 74/08* (2013.01); *H04W 74/02* (2013.01); *H04W 74/0816* (2013.01)

(58) Field of Classification Search
    CPC ................ H04W 74/0866; H04W 72/14

(Continued)

(56) References Cited

U.S. PATENT DOCUMENTS

| 6,721,775 | B1 * | 4/2004 | Fagen ............... | G06F 9/524 |
| | | | | 718/100 |
| 6,842,437 | B1 * | 1/2005 | Heath ............... | H04B 7/1858 |
| | | | | 370/322 |
| 8,046,484 | B2 * | 10/2011 | Ayyagari ............ | H04B 3/54 |
| | | | | 370/390 |
| 2004/0081089 | A1 * | 4/2004 | Ayyagari ............ | H04B 3/54 |
| | | | | 370/229 |

(Continued)

OTHER PUBLICATIONS

J. Fang, K. Tan, Y. Zhang, S. Chen, L. Shi, J. Zhang, Y. Zhang, and Z. Tan, "Fine-grained channel access in wireless LAN," IEEE/ACM Transactions on Networking (TON), vol. 21, No. 3, pp. 772-787, 2013.

(Continued)

*Primary Examiner* — Mang Yeung
*Assistant Examiner* — Peter G Solinsky
(74) *Attorney, Agent, or Firm* — Spruson & Ferguson (Hong Kong) Limited

(57) ABSTRACT

A MAC protocol, useful for WLANs, is provided for random access over a channel. The protocol includes three concurrent processes. The channel includes a contention subchannel and a transmission subchannel. In the contention process, all nodes use the standard RTS/CTS mechanism operated on the contention subchannel to contend for a transmission right. When one node gains the right, all the nodes store the contention result into their respective contention queue (CQ) buffers. In the transmission process, the nodes sequentially transmit their data over the transmission subchannel according to the order of the nodes stored in the CQ buffers. When one node finishes transmission, the CQ buffers are updated. The contention and transmission processes are connected by the queuing process for dynamically updating each node's CQ buffer. When OFDM is used in a random-access system, numbers of data subcarriers in both subchannels for maximizing the system throughput are given.

14 Claims, 11 Drawing Sheets

Related U.S. Application Data

(60) Provisional application No. 62/193,065, filed on Jul. 15, 2015.

(58) Field of Classification Search
USPC .................................................. 370/329
See application file for complete search history.

(56) References Cited

U.S. PATENT DOCUMENTS

| | | | |
|---|---|---|---|
| 2006/0055958 A1* | 3/2006 | Kim | H04L 29/06 358/1.14 |
| 2006/0268786 A1* | 11/2006 | Das | H04B 7/2618 370/335 |
| 2010/0279672 A1* | 11/2010 | Koskela | H04W 36/30 455/418 |
| 2013/0297754 A1* | 11/2013 | Wentink | H04W 48/18 709/220 |
| 2013/0343387 A1* | 12/2013 | Stroud | H04L 45/74 370/392 |
| 2014/0071865 A1* | 3/2014 | Aggarwal | H04L 5/143 370/295 |
| 2014/0302787 A1* | 10/2014 | Rantala | H04W 4/008 455/41.2 |
| 2015/0312938 A1* | 10/2015 | Larmo | H04W 72/0406 370/329 |
| 2016/0094318 A1* | 3/2016 | Shattil | H04B 7/026 375/267 |
| 2016/0174221 A1* | 6/2016 | Patil | H04L 5/0055 370/329 |
| 2016/0337110 A1* | 11/2016 | Yang | H04L 1/1854 |
| 2016/0338106 A1* | 11/2016 | Liu | H04W 74/0816 |

OTHER PUBLICATIONS

E. Perahia and M. X. Gong, "Gigabit wireless LANs: An overview of IEEE 802.11ac and 802.11ad," ACM SIGMOBILE Mobile Computing and Communications Review, vol. 15, pp. 23-33, 2011.

P. Jardosh, K. N. Ramachandran, K. C. Almeroth, and E. M. Belding-Royer, "Understanding congestion in ieee 802.11 b wireless networks," Proceedings of the 5th ACM SIGCOMM Conference on Internet Measurement, pp. 25-25, USENIX Association, 2005.

S. Sen, R. R. Choudhury, and S. Nelakuditi, "Listen (on the frequency domain) before you talk," Proceedings of the 9th ACM SIGCOMM Workshop on Hot Topics in Networks, p. 16, 2010.

P. Huang, X. Yang, and L. Xiao, "Wifi-BA: Choosing arbitration over backoff in multicarrier wireless networks," Proceedings of IEEE INFOCOM'13, pp. 771-779, 2013.

S. Sen, R. R. Choudhury, and S. Nelakuditi, "No time to countdown: Migrating backoff to the frequency domain," Proceedings of the 17th annual international conference on Mobile computing and networking, pp. 241-252, 2011.

M. Heusse, F. Rousseau, R. Guillier, and A. Duda, "Idle sense: an optimal access method for high throughput and fairness in rate diverse wireless LANs," Proceedings of ACM SIGCOMM'05, 2005.

S. N. Premnath, D. Wasden, S. K. Kasera, N. Patwari, and B. Farhang-Boroujeny, "Beyond OFDM: best-effort dynamic spectrum access using filterbank multicarrier," IEEE/ACM Transactions on Networking, vol. 21, issue 3, pp. 869-882, 2013.

N. Michailow et al., "Generalized Frequency Division Multiplexing for 5th Generation Cellular Networks," IEEE Transactions on Communications, vol. 62, No. 9, pp. 3045-3061, Aug. 2014.

G. Bianchi, "Performance analysis of the IEEE 802.11 distributed coordination function," IEEE Journal on Selected Areas in Communications, vol. 18, No. 3, pp. 535-547, Mar. 2000.

A. Kumar, E. Altman, D. Miorandi, and M. Goyal, "New insights from a fixed point analysis of single cell IEEE 802.11 WLANs," IEEE/ACM Transactions on Networking, vol. 15, No. 3, pp. 588-601, Mar. 2007.

Q. Zhao, D. H. K. Tsang, and T. Sakurai, "A novel CAC scheme for homogeneous 802.11 networks," IEEE Transactions on Wireless Communications, vol. 9, No. 3, pp. 1168-1174, 2010.

\* cited by examiner

QUEUE-BASED MAC PROTOCOL WITH SUBCARRIER ALLOCATION OPTIMIZATION

CROSS-REFERENCE TO RELATED APPLICATION

The application claims priority to U.S. Provisional Patent Application No. 62/193,065 filed on Jul. 15, 2015. This application is also a continuation-in-part of U.S. patent application Ser. No. 14/828,159 filed on Aug. 17, 2015, which claims the benefit of U.S. Provisional Patent Application No. 62/193,065. The disclosures of U.S. patent application Ser. No. 14/828,159 and U.S. Provisional Patent Application No. 62/193,065 are hereby incorporated by reference in their entirety.

LIST OF ABBREVIATIONS

ACK acknowledgement
AP access point
BEB binary exponential backoff
CA collision avoidance
CIFS contention queuing inter frame spacing
CQ contention queuing
CSMA carrier sense multiple access
CTS clear to send
DCF distributed coordination function
DFT Discrete Fourier Transform
DIFS DCF inter-frame space
ID identity
IDFT Inverse Discrete Fourier Transform
LTE Long Term Evolution
MAC media access control
OFDM orthogonal frequency division multiplexing
OFDMA orthogonal frequency-division multiple access
PHY physical layer
QoS quality of service
RB resource block
RTS request to send
SIFS short inter-frame space
TDMA time division multiple access
WLAN wireless local area network

BACKGROUND

Field of the Invention

The present invention generally relates to a MAC protocol for a multiple-access communication system with multiple nodes contending for a channel. In particular, the present invention relates to the MAC protocol incorporating using a contention queue for coordinating different nodes for data transmission.

LIST OF REFERENCES

There follows a list of references that are occasionally cited in the specification. Each of the disclosures of these references is incorporated by reference herein in its entirety.
[1] J. G. Proakis and M. Salehi, *Digital Communications*, NewYork: McGraw-Hill, 2008.
[2] J. Fang, K. Tan, Y. Zhang, S. Chen, L. Shi, J. Zhang, Y. Zhang, and Z. Tan, "Fine-grained channel access in wireless LAN," *IEEE ACM Transactions on Networking (TON)*, vol. 21, no. 3, pp. 772-787, 2013.
[3] IEEE 802.11—wireless lan medium access control (mac) and physical layer (phy) specifications (IEEE Std. 02.11-2007), IEEE, June 2007.
[4] IEEE 802.11n—enhancements for higher throughput, amendment 4 to IEEE 802.11 part 11: Wireless lanmedium access control (mac) and physical layer (phy) specifications (*IEEE 802.11n/D3.11*), IEEE, December 2007.
[5] E. Perahia and M. X. Gong, "Gigabit wireless LANs: An overview of IEEE 802.11ac and 802.11ad," *ACM SIGMOBILE Mobile Computing and Communications Review*, vol. 15, pp. 23-33, 2011.
[6] P. Jardosh, K. N. Ramachandran, K. C. Almeroth, and E. M. Belding-Royer, "Understanding congestion in ieee 802.11 b wireless networks," *Proceedings of the 5th ACM SIGCOMM Conference on Internet Measurement*, pp. 25-25, USENIX Association, 2005.
[7] S. Sen, R. R. Choudhury, and S. Nelakuditi, "Listen (on the frequency domain) before you talk," *Proceedings of the 9th ACM SIGCOMM Workshop on Hot Topics in Networks*, p. 16, 2010.
[8] P. Huang, X. Yang, and L. Xiao, "Wifi-BA: Choosing arbitration over backoff in multicarrier wireless networks," *Proceedings of IEEE INFOCOM'13*, pp. 771-779, 2013.
[9] S. Sen, R. R. Choudhury, and S. Nelakuditi, "No time to countdown: Migrating backoff to the frequency domain," *Proceedings of the 17th annual international conference on Mobile computing and networking*, pp. 241-252, 2011.
[10] M. Heusse, F. Rousseau, R. Guillier, and A. Duda, "Idle sense: an optimal access method for high throughput and fairness in rate diverse wireless LANs," *Proceedings of ACM SIGCOMM'05*, 2005.
[11] IEEE Standard for Local and Metropolitan Area Networks Part 16: Air Interface for Broadband Wireless Access Systems (*IEEE Std 802.16-2009*), IEEE, 2009.
[12] "3GPP TS 36.213 V11.1.0 (2012-02): Physical layer procedures (release 11)," available at: http://www.3gpp.org/ftp/Specs/archive/36_series/36.213/36213-b10.zip
[13] S. N. Premnath, D. Wasden, S. K. Kasera, N. Patwari, and B. Farhang-Boroujeny, "Beyond OFDM: best-effort dynamic spectrum access using filterbank multicarrier," *IEEE/ACM Transactions on Networking*, vol. 21, issue 3, pp. 869-882, 2013.
[14] N. Michailow et al., "Generalized Frequency Division Multiplexing for 5th Generation Cellular Networks," *IEEE Transactions on Communications*, vol. 62, no. 9, pp. 3045-3061, August 2014.
[15] G. Bianchi, "Performance analysis of the IEEE 802.11 distributed coordination function," *IEEE Journal on Selected Areas in Communications*, vol. 18, no. 3, pp. 535-547, March 2000.
[16] A. Kumar, E. Altman, D. Miorandi, and M. Goyal, "New insights from a fixed point analysis of single cell IEEE 802.11 WLANs," *IEEE/ACM Transactions on Networking*, vol. 15, no. 3, pp. 588-601, March 2007.
[17] Q. Zhao, D. H. K. Tsang, and T. Sakurai, "A novel CAC scheme for homogeneous 802.11 networks," *IEEE Transactions on Wireless Communications*, vol. 9, no. 3, pp. 1168-1174, 2010.

DESCRIPTION OF RELATED ART

With the rapid development of modern communication technologies such as OFDM [1], the physical-layer data rate of IEEE 802.11 networks has increased significantly. However, the throughput efficiency (i.e. the ratio between the throughput and the PHY data rate) may degrade rapidly. For example, it has been pointed out in [2] that if the packet size is 1500 bytes, the efficiency quickly decreases from 60% at 54 Mb/s (802.11a/g) [3], [4] to less than 10% at 1 Gb/s (802.11ac/ad) [5]. On the other hand, with a growing deployment of various multimedia applications with diverse QoS requirements, IEEE 802.11 networks, which were originally designed to provide best-effort services, are very hard to meet these QoS requirements.

It is desirable to have a MAC technique that can improve the throughput efficiency over existing techniques while supporting a variety of QoS requirements. Advantageously, it is also desirable if the MAC technique achieves a system throughput as high as possible by optimizing some parameters used in the technique. The MAC technique is not only useful for WLANs but also other multiple-access communication systems that employ random access. There is a need in the art for this technique.

SUMMARY OF THE INVENTION

An aspect of the present invention is to provide a method for enabling a plurality of nodes to communicate with an AP over a multiple-access channel. The channel includes a contention subchannel and a transmission subchannel both of which are separate from each other. Each of the nodes has a node ID for identification. Each of the AP and the nodes has an individual CQ buffer for storing a waiting queue of the node IDs of the nodes each already granted with a right of data transmission by the AP.

The method is described as follows. When a first node being one of the nodes has data to be sent to the AP, the first node contends for the right of data transmission until the AP grants this right to the first node. In performing this contention, the first node communicates with the AP over the contention subchannel. When the AP grants the right to the first node, each of the AP and the nodes enqueues the CQ buffer thereof with the node ID of the first node. When the node ID of the first node in the waiting queue of the first node's CQ buffer has a position such that the first node is permitted to send out the data thereof to the AP, the first node transmits the data of the first node to the AP over the transmission channel. When data transmission from the first node to the AP completes, each of the AP and the nodes dequeues from the CQ buffer thereof the node ID of the first node.

In one embodiment, the first node contends for the right of data transmission by sending a RTS to the AP over the contention subchannel, and repeating this sending until the AP transmits a CTS on the contention subchannel to declare that the AP grants the right of data transmission to the first node. Before performing the sending of the RTS, the first node may sense the contention subchannel to determine whether the contention subchannel has been idle for a pre-determined value of DIFS so as to determine whether or not to immediately send out the RTS over the contention subchannel. If the contention subchannel is sensed not to have been idle for the DIFS, the first node re-performs this sensing after the backoff duration determined according to a BEB algorithm. Otherwise, the first node sends the RTS over the contention subchannel.

When data transmission from the first node to the AP completes, the AP may broadcast an ACK to all the nodes so as to inform each of the nodes to perform the dequeuing of the node ID of the first node from the CQ buffer thereof.

When the AP detects that the CQ buffers of all the nodes and the AP are not synchronized, the AP may broadcast the CQ buffer of the AP to the nodes so as to resynchronize the CQ buffers of all the nodes with the CQ buffer of the AP.

When the CQ buffers of all the nodes and the AP are synchronized and are not empty, there are one or more second nodes having the node IDs thereof in the waiting queue of any of the CQ buffers. The one or more second nodes may transmit the data thereof to the AP in a sequential manner of one second node by another second node such that the order of the one or more second nodes in data transmission follows the order of the node IDs in the waiting queue. In one option, the waiting queue is a first-in first-out queue.

When OFDM is employed in data communications between the AP and each of the nodes, it is preferable that the data-subcarrier numbers of the contention subchannel and of the transmission subchannel are selected to maximize the system throughput. To achieve this goal, the nodes are first arranged to have a common timing-synchronization reference such that time is segmented into time segments of a fixed length equal to one OFDM symbol time and such that when any of the nodes has an OFDM symbol transmitted on either the contention subchannel or the transmission subchannel, the OFDM symbol is time-aligned with one of the time segments. Then allocate the numbers of data subcarriers to the contention subchannel and to the transmission subchannel according to (9) and (10), respectively, to be disclosed below.

Other aspects of the present invention are disclosed as illustrated by the embodiments hereinafter.

DETAILED DESCRIPTION

The following definitions are used herein in the specification and appended claims. "A subcarrier number" or "the subcarrier number" means the number of subcarrier(s). In addition, the number of subcarrier(s) is a non-negative number, including zero as a special case. "A data-subcarrier number" is similarly defined, meaning the number of data subcarrier(s). "A system throughput" or simply "a throughput" is defined as the number of successfully transmitted bits in a system over a unit time. The system is a random-access communication system such as a WLAN system. "An OFDM symbol time" is the time duration given by the sum of individual time durations of an OFDM symbol body (which carries transmitted data) and a cyclic prefix. Note that the reciprocal of an OFDM symbol time as used in an OFDM-based communication system gives the corresponding OFDM-symbol transmission rate.

The present invention provides a MAC protocol, called as a CSMA/CQ technique, with an objective of improving the throughput efficiency. As will be shown, the CSMA/CQ technique uses a contention subchannel in a multiple-access channel for the purpose of channel contention, and a data transmission subchannel for data transmission. The present invention also provides an optimal subcarrier allocation scheme for both subchannels in order to maximize the throughput efficiency.

Although the invention is hereinafter described in embodiments predominantly based on an example application of the invention to WLANs, the present invention is not limited only to applications for WLANs. The disclosed CSMA/CQ technique is applicable for a communication system in which plural nodes communicate with an AP over a multiple-access channel. The multiple-access channel may be an OFDM channel where each of the nodes uses OFDM to communicate with the AP.

A. The CSMA/CQ Technique

Figure 1:
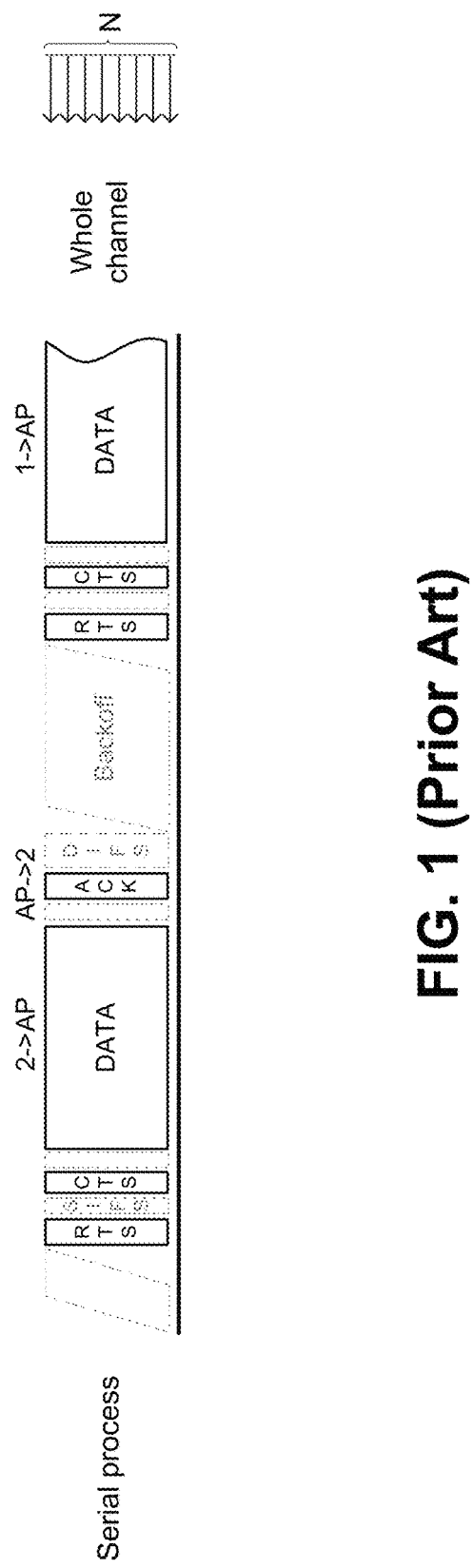
FIG. 1 depicts an example of channel contention and transmission used in an existing IEEE 802.11 system, showing that serial execution of channel contention and transmission occupies the whole channel for an existing DCF technique.

In an existing IEEE 802.11 DCF system employing the RTS/CTS mode, a serial process is used. With the help of FIG. 1, the serial process of DCF is outlined. In the system, after the channel is sensed to have been idle for the duration of DIFS, each node starts to contend for the channel using the 802.11 DCF BEB algorithm, and then sends a RTS frame to an AP for reserving the channel. (The DIFS is a preset time threshold for determining if the channel is likely to be not used by other nodes.) Upon receiving a CTS feedback from the AP, the RTS sender transmits a DATA frame to the AP. Finally, the AP sends an ACK back to the sender node. In FIG. 1, for example, node 2 executes the whole serial process following the pattern: DIFS/backoff/RTS/SIFS/CTS/SIFS/DATA/SIFS/ACK, where the SIFS is the time that the transmitting station will be able to switch back to the receive mode and be capable of decoding the incoming packet.

One fundamental reason for this throughput inefficiency experienced by the existing IEEE 802.11 DCF system is that the contention process and the data transmission process are tightly coupled. That is, all nodes must first contend for the whole channel and then the winner performs an immediate transmission over the channel. This tight coupling relationship dictates a serial execution of the two processes. As a consequence, the whole system is in an either contention or transmission state. In the contention state, all nodes perform backoff and the whole channel remains idle, naturally leading to a low channel utilization. It has been shown in [6] that because of backoff, more than 30% of throughput is reduced. In addition, the lack of QoS support is also deeply related to the tight coupling of the channel contention and the data transmission. Only in the contention process, a few parameters are allowed to be statically configured for providing service differentiation. Such very limited control is the root of failing to meet diverse QoS requirements.

In short, the serial prosecution of the contention process and the data transmission process has the following drawbacks. First, the backoff process, generally taking a quite long time, often forces the whole channel to be idle. It seriously lowers the channel utilization. Second, the DCF allocates the entire channel to a node as a single resource. This allocation strategy becomes too coarse-grained when the PHY data rate increases [1].

Therefore, it is desirable to decouple the contention process and the data transmission process, and enforce more controls in order to minimize the contention overheads and provide guaranteed QoS services.

The CSMA/CQ technique overcomes the two drawbacks by decomposing the above-mentioned serial execution of the contention process and the data transmission process into three concurrent processes. In the CSMA/CQ technique, the whole OFDM channel is split into two subchannels: one for contention and the other one for data transmission. The CSMA/CQ technique has two salient features: (1) channel contention is in a distributed fashion; and (2) data transmission is in a centralized-control fashion. On the subchannel assigned for contention (hereinafter referred to as the contention subchannel), all nodes follow the 802.11 DCF with the RTS/CTS mode to reserve the subchannel assigned for data transmission (hereinafter referred to as the transmission subchannel). Unlike the existing DCF used by the IEEE 802.11 standard, where the winner in channel contention immediately transmits the data over the whole channel during the next slot, the winner in the CSMA/CQ technique is first added to a contention queue (or a contention buffer) that is broadcast to all nodes so that all the nodes are aware of the position of the winner in the queue. The winner sends the data over the transmission subchannel only during the turn of this winner. On the transmission subchannel, all nodes perform TDMA-like transmission following the order of the node IDs in the contention queue. All the nodes share the same contention queue and therefore the data transmission is performed in a centralized-control fashion. One advantage of the CSMA/CQ technique is that contention and data transmission are executed in parallel so that the whole channel bandwidth is more efficiently utilized.

In the CSMA/CQ technique, particularly, the original serial process as employed in the existing IEEE 802.11 DCF system is broken down into a contention process, a transmission process and a queuing process with different resources, where the three processes are run concurrently. The contention process employs the contention subchannel as a resource, whereas the transmission process employs the transmission subchannel. For the queuing process, a CQ buffer is used to coordinate the execution of the contention process and the transmission process. With an aid of FIG. 2, the three processes are described as follows.

In the contention process 210, all the nodes use the standard RTS/CTS mechanism in DCF to contend for the channel. When one node finishes a RTS/CTS handshake, all the nodes store the contention result into their respective CQ buffers. As an example shown in FIG. 2, nodes 2, 1, 3 sequentially win the channel, and all the nodes add these node IDs into their respective buffers one by one.

In the transmission process 230, as long as the CQ buffer of an individual node is not empty, the nodes first listen to the channel, and then sequentially transmit their frames according to the order of node IDs stored in the CQ buffer. For each completion of transmission by one node, all the nodes delete the corresponding node ID from their buffers. As an example illustrated in FIG. 2, nodes 2, 1, 3 sequentially complete their transmissions, and all the nodes remove these node IDs from their buffers one by one.

Figure 2:
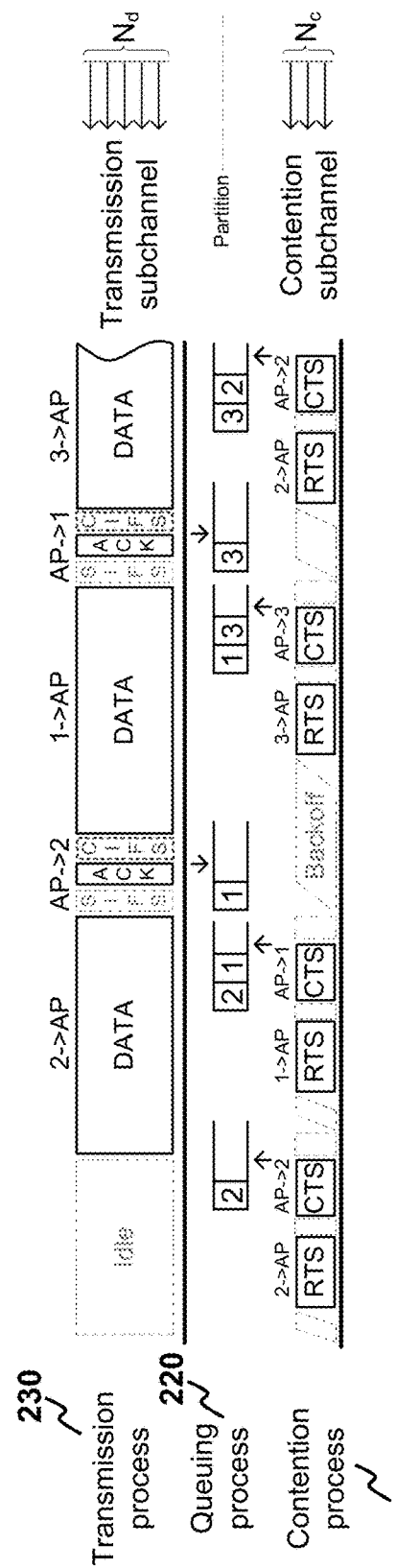
FIG. 2 depicts the channel contention process and the transmission process for CSMA/CQ in accordance with an exemplary embodiment of the present invention, where the two processes are performed on separate subchannels, thereby allowing concurrent execution of the two processes.

By means of the queuing process 220, the contention process 210 and the transmission process 230 are connected. In the queuing process 220, each node dynamically manipulates its own CQ buffer according to the contention process 210 and the transmission process 230. For example, as shown in FIG. 2, nodes 2 and 1 first win the channel in order, and then node 2 completes its transmission. As a result, all the nodes first add the IDs of nodes 2 and 1 into their respective CQ buffers sequentially, and then remove the ID of node 2 from their buffers. In the same manner, the queuing process 220 repeats.

In short, the three processes 210, 220, 230 are concurrently executed, without wasting the whole channel for idle during contention. It greatly improves channel utilization.

A comparison between the CSMA/CQ technique and existing techniques is made as follows. The CSMA/CQ technique aims at supporting concurrent execution of channel contention and data transmission, utilizing an OFDMA mechanism (where a part of OFDM subcarriers is used for the channel contention and the other part is used for the data transmission). In contrast, most existing OFDM-based schemes [2], [7]-[9] still keep the channel contention and the data transmission being executed serially; these schemes differ mainly in the channel contention process. In [7] and [9], the authors thereof proposed a frequency-domain contention scheme called T2F and Back2F. In this scheme, each node randomly chooses a subcarrier to signal and the node choosing a subcarrier ID number that is smallest among all contending nodes is the winner; upon the completion of contention, the winner immediately transmits data over all subcarriers. Different from T2F and Back2F, the authors of [2] proposed a fine-grained channel access scheme called FICA. In this scheme, each node contends for a certain number of subcarriers according to its traffic demand, and then transmits data over these subcarriers upon success. In [8], the author thereof proposed a bitwise arbitration mechanism called WiFi-BA. In this scheme, each node adopts a time- and frequency-domain mechanism to resolve collision; upon success, the winner transmits data over the whole subcarriers.

B. An Exemplary Implementation of a CSMA/CQ System

Figure 3:
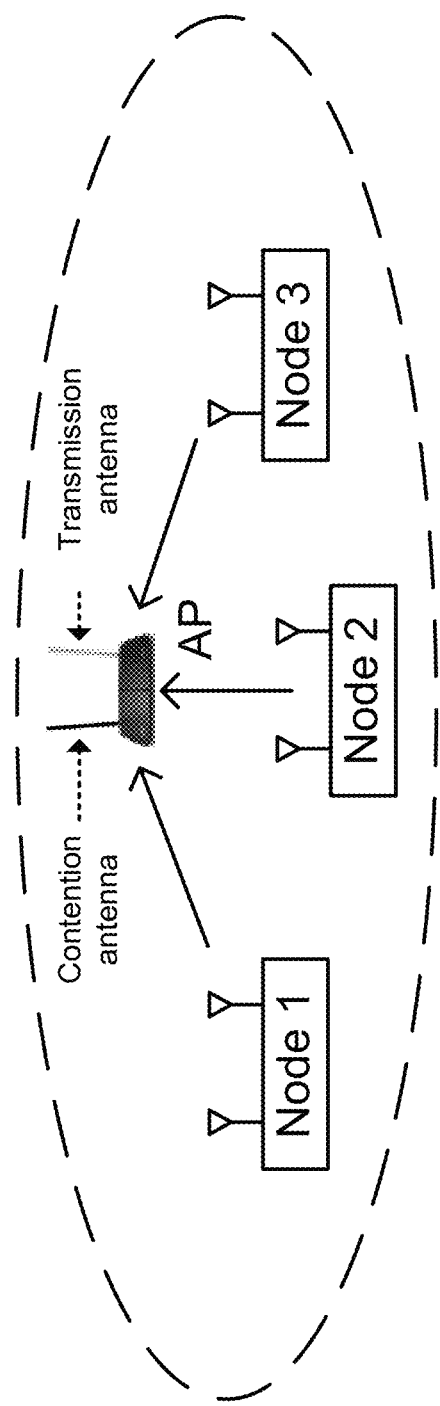
FIG. 3 is a topology of a WLAN used as an example for illustration of the present invention.

In this section, an exemplary CSMA/CQ design in an infrastructure-based WLAN (as shown in FIG. 3) is detailed, where there are one AP and a number of nodes.

B.1 PHY Design

In CSMA/CQ, each node and the AP have two antennas: one for channel contention and another for data transmission (as shown FIG. 3). The two antennas can work concurrently, like the system of [9].

The physical layer of a CSMA/CQ system adopts the OFDM modulation scheme [1], which has been widely used in modern wireless communication systems such as IEEE 802.11a/g/n WLANs [3], [4], WiMAX [11], and 4G LTE systems [12]. By using the OFDM scheme, a given channel is divided into a number of subcarriers including data subcarriers for data transmission, pilot subcarriers for estimation and synchronization purposes, and null subcarriers for guard bands. For example, in a WLAN compliant to the IEEE 802.11a/g specifications, a 20 MHz channel is divided into 48 data subcarriers, 4 pilot subcarriers, and 12 null subcarriers. To send a packet, an OFDM transmitter first modulates data in the packet onto each data subcarrier, then performs an IDFT to convert these frequency-domain data blocks into a series of time-domain data blocks, and finally transmits the time-domain data blocks. At a receiving side, an OFDM receiver recovers the packet by performing a DFT operation on these time-domain data blocks. In the art, each time-domain data block is called as an OFDM symbol. Note that each OFDM symbol is a superposition of all subcarriers. When OFDM is used in multi-access environments such as WiMax networks and LTE systems, a multi-access technology called OFDMA has been proposed to ensure that OFDM symbols from multiple nodes are aligned. It requires that all mobile stations maintain tight timing synchronization with a central controller.

Figure 4:
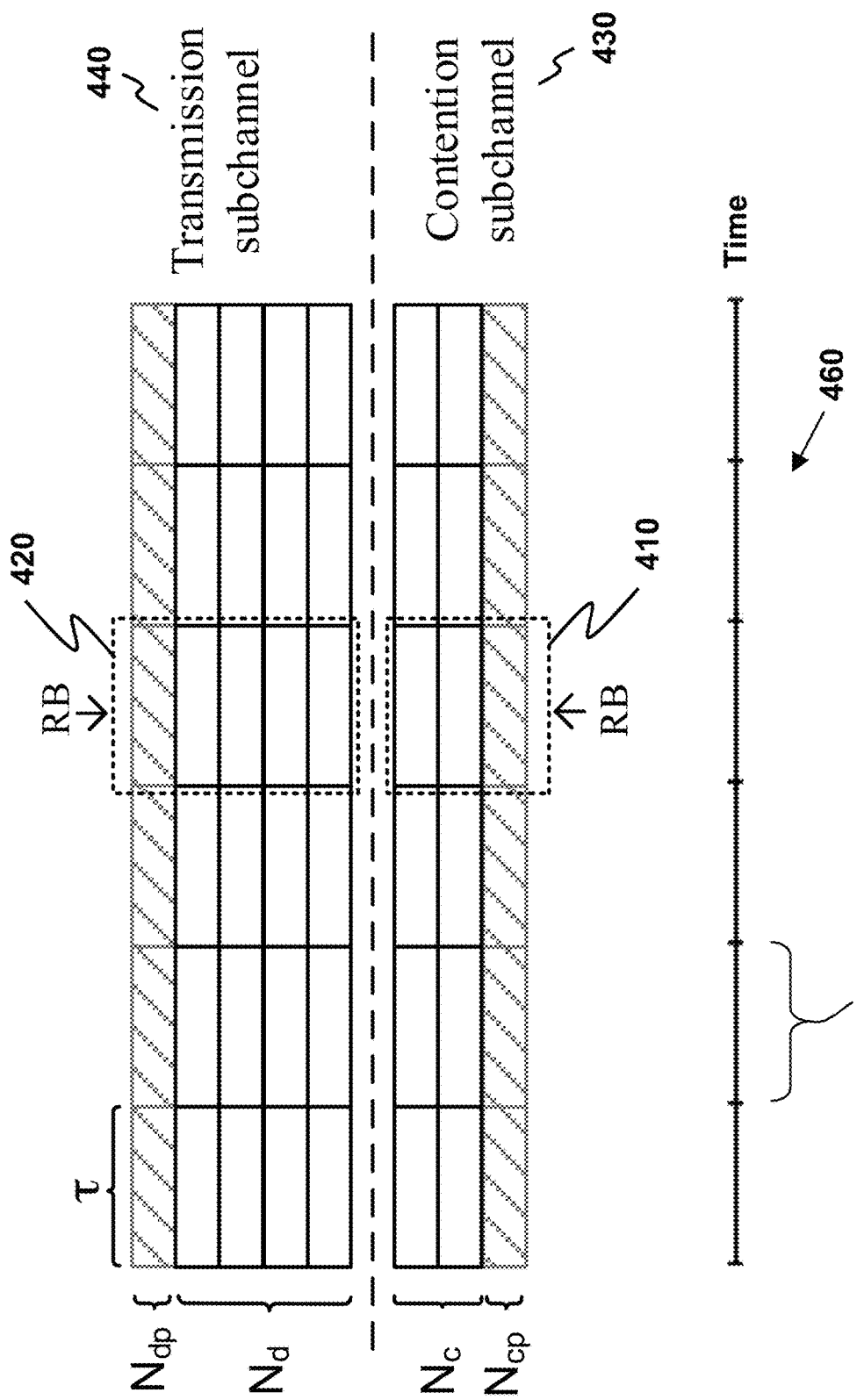
FIG. 4 depicts an arrangement of RBs in CSMA/CQ.
Figure 5:
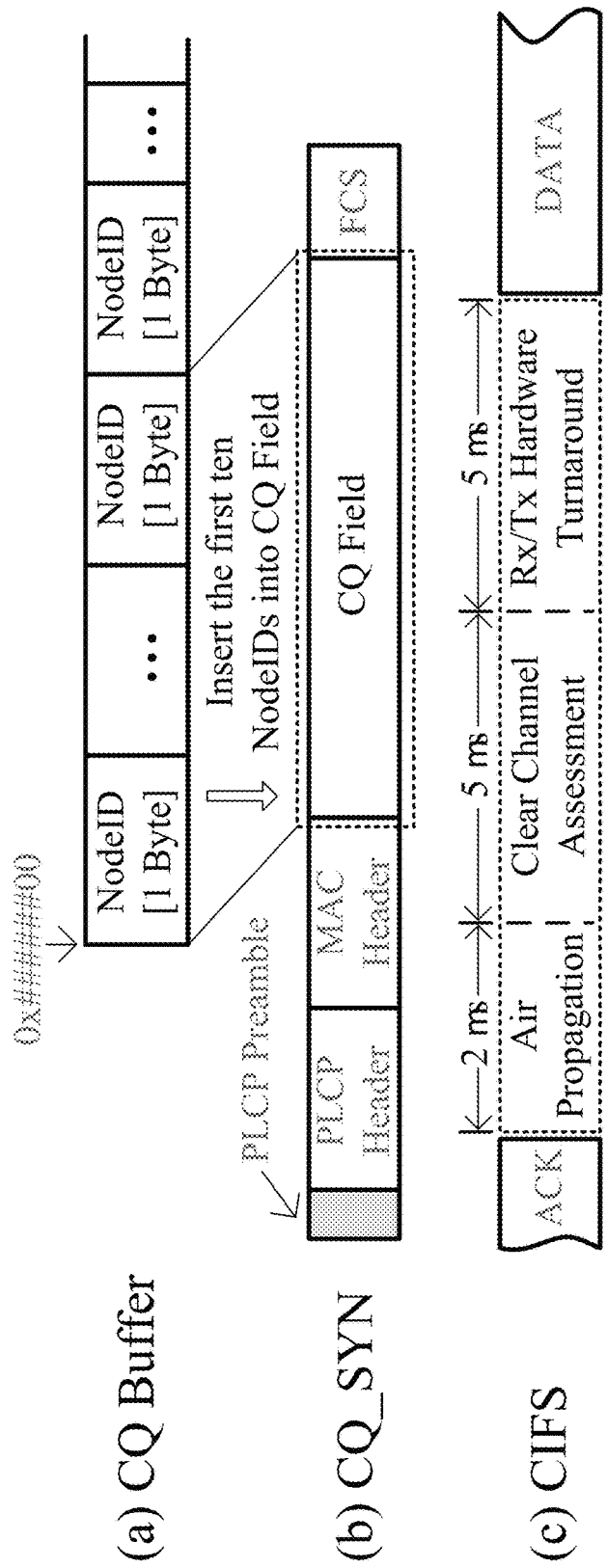
FIG. 5 depicts, in accordance with one embodiment of the present invention, three new structures used in CSMA/CQ: (a) CQ Buffer; (b) CQ_SYN; and (c) CIFS.

Without loss of generality, consider that the whole channel has N data subcarriers, $N_p$ pilot subcarriers, and some null subcarriers. The whole channel can be partitioned into two subchannels (as illustrated in FIG. 4): a contention subchannel that consists of $N_c$ data subcarriers and $N_{cp}$ pilot subcarriers; and a transmission subchannel that consists of $N_d$ data subcarriers and $N_{dp}$ pilot subcarriers, where $N=N_c+N_d$ and $N_p=N_{cp}+N_{dp}$. How to spread the pilot subcarriers is implementation-dependent. For example, in an IEEE 802.11a WLAN, the pilot subcarriers can be uniformly spread throughout the transmission bandwidth.

In the CSMA/CQ system, a contention antenna and a transmission antenna of the AP are used for transmitting/receiving signals on the contention subchannel and on the transmission subchannel, respectively. The time is divided into a series of time slots. The channel contention or the data transmission starts at the beginning of a slot. There are two design requirements as follows.

Each antenna can decode the received data correctly and independently in every symbol time.

Each antenna can transmit or receive data at the beginning of any slot, whenever the AP wants, without worrying about whether an OFDM symbol is aligned or not.

The first design requirement implies that strict time-synchronization of each OFDM symbol should be maintained. The second design requirement implies that for each node, the random channel access and the data transmission are independent, ensuring that the contention and transmission processes can be executed concurrently.

To further elaborate the PHY design of CSMA/CQ, let τ denote an OFDM symbol time. Similar to the LTE specification, define a RB (viz., a resource block) for each subchannel as follows with the aid of FIG. 4.

A RB 410 of the contention subchannel 430 is a minimum time-and-frequency resource unit that occupies $N_c+N_{cp}$ subcarriers and one OFDM symbol time.

A RB 420 of the transmission subchannel 440 is a minimum time-and-frequency resource unit that occupies $N_d+N_{dp}$ subcarriers and one OFDM symbol time.

To fulfill the above-mentioned two design requirements, the following two rules are made.

In each OFDM symbol time, the two RBs of the two subchannels are time-aligned. In other words, time 460 is divided into time segments (e.g., a typical time segment 465) of a fixed length equal to OFDM symbol time, and an OFDM symbol transmitted on either the contention subchannel or the transmission subchannel is time-aligned with one of the time segments.

Each time block (viz., slot, DIFS, SIFS, CIFS, RTS, CTS, DATA, and ACK) is an integer multiple of the OFDM symbol time.

The first rule fulfills the first design requirement, as explained as follows. When the contention antenna constructs an OFDM symbol, the RB of the transmission subchannel can be set to zero. When the transmission antenna constructs an OFDM symbol, the RB of the contention subchannel can be set to zero. According to the first rule, during every symbol time, the two RBs transmitted by the two antennas are always aligned and therefore each antenna can always decode an OFDM symbol correctly under idea channel conditions. The second rule fulfills the second design requirement. The reason is as follows. According to the second rule, a slot is an integer multiple of the OFDM symbol time. Then, as long as the channel access or the data transmission starts at the beginning of any slot, one can always align all OFDM symbols. Therefore, each antenna can work independently.

Finally, note that the first rule is easily achievable, as long as each node maintains tight timing synchronization with the AP as similarly required in a WiMax network and a LTE system. The second rule is also easily achievable, because it only involves some parameter settings. In other words, the PHY design of the CSMA/CQ system does not add more additional implementation complexities than PHY designs in existing standards such as WiMax and LTE. In addition, one can also adopt the state-of-the-art PHY data-transmission techniques (such as FBMC [13] and GFDM [14]) to improve the PHY design of CSMA/CQ and thereby increase the spectral efficiency.

B.2 MAC Design

B.2.1 Three New Structures

CSMA/CQ introduces three novel structures (as illustrated in FIG. 4): the CQ buffer, the CQ_SYN frame, and the CIFS interval.

Cq_Buffer:

The CQ buffer consists of at most 20 bytes. It is used to store the ID of the winner in contention process. When one contention process finishes, the winner's ID will be enqueued into the CQ buffer. When one transmission process finishes, the ID of the node transmitting the frame will be dequeued from the CQ buffer.

CQ_SYN:

CQ_SYN is a frame consisting of PLCP Preamble, PLCP header, MAC header, CQ field and FCS field. The CQ_SYN is used to synchronize the transmitting order, where the length of CQ filed is selected to be 10 bytes (though other values may also be used), and where each byte is used to store one node ID. Without loss of generality, here it is assumed that each node ID is mapped from its MAC address. In the transmission process, once detecting that the current sender's ID is not the head of the CQ buffer, the AP constructs a CQ_SYN frame and inserts the first ten node IDs in its own CQ into the CQ field, and then broadcasts it. Upon receiving the CQ_SYN, all nodes will update their CQ buffers.

CIFS:

A CIFS time is set to 12 s, consisting of an Air Propagation, a Clear Channel Assessment and an Rx/Tx Hardware Turnaround time, where Air Propagation is set to 2 μs and the other two are set to 5 μs. The purpose of CIFS is to provide a protection interval when one node's transmission is switched to another one's. It marks the end of the current transmission, and the beginning of a new transmission.

B.2.2 MAC Protocol

For simplicity, the MAC design is described by focusing on the uplink traffic. That is, all nodes send DATA to the AP but the AP just acts as a receiver. In CSMA/CQ, all nodes follows the BEB algorithm to perform the contention process (specified in Algorithm 1 and Algorithm 2 to be detailed below) over the contention subchannel, where the winner of each contention will be added into the CQ buffer. At the same time, all nodes also perform the TDMA-like transmission process (specified in Algorithm 3 and Algorithm 4 to be detailed below) according to the order of node IDs stored in the CQ buffer. The four algorithms are detailed as follows.

---
Algorithm 1: Contention process (Node → AP)
---
01: Perform backoff (like BEB)
02: // Case 1: Node counts down to zero
03: Send a RTS
04: Delay(SIFS) /*Wait for a CTS*/
05: // If Node itself wins.
06: if Receive a CTS feedback then
07:   /* Node joins buffer and waits for its transmission
08:   (instead of transmitting immediately as in DCF) */
09:   CQ_Enqueue(CTS.DstID)
10: else /* RTS collides */
11:   Increase contention window
12: // Case 2: Node is in backoff
13: if Receive a CTS then // other node wins
14:   CQ_Enqueue(CTS.DstID) // Add it into buffer.
---

Algorithm 1 specifies the contention process (Node→AP) where each node transmits RTS over the contention subchannel to reserve the transmission subchannel. In this process, each node performs backoff as BEB. Once the backoff counter reaches zero, the node immediately sends a RTS to the AP and expects a CTS feedback. If there comes a CTS, both the node itself (i.e. the RTS sender in case 1) and other nodes (i.e. the "backing off" nodes in case 2) enqueue CTS.DstID (i.e. the node ID mapped from the Destination field in CTS or the corresponding RTS sender's ID) into their CQ buffers. If there is a collision, the collided nodes double the contention windows, and then perform backoff and repeat the above process.

---
Algorithm 2: Contention process (AP → Node)
---
01: if Receive a RTS then
02:   * Add the sender into buffer for scheduling
03:   its transmission */
04:   CQ_Enqueue(RTS.SrcID)
05:   Feed back a CTS (like DCF)
06: end
---

Algorithm 2 specifies the contention process (AP→Node), where the AP feeds back CTS over the contention subchannel. When the AP receives a RTS frame, it enqueues RTS.SrcID (i.e. the RTS sender's ID) into its CQ buffer, and sends back a CTS like DCF. Note that when compared with DCF, CSMA/CQ does not use the Duration field in RTS and CTS frames, so more functions can be extended to use this Duration field.

---
Algorithm 3: Transmission process (Node → AP)
---
01: while (CQ_Head ~= Null)
02:   // Case 1: Node is at the CQ_Head
03:   if (CQ_Head == NodeID) then
04:     if channel remains idle for CIFS then
05:       Send a DATA frame -continued Algorithm 3: Transmission process (Node → AP)

```
06:      Delay(SIFS) // Wait for an ACK
07:      if Receive an ACK then
08:         CQ_Dequeue( ) // Delete the ID of transmitted node
09:      else // Update CQ buffer by AP's feedback
10:         if Receive a CQ_SYN then
11:            CQ_Update(CQ_SYN)
12:            /* If Node is no longer at the CQ_Head, it drops the
13:               frame being transmitted; otherwise, retransmit */
14:            if (CQ_Head ~= NodeID) Drop the data frame
15:         else // CQ_SYN timeout
16:            Goto line 01
17:      end
18:      // Case 2: Node is not at the CQ_Head
19:      if (CQ_Head ~= NodeID) then // Other node is in transmission
20:         if Receive an ACK then CQ_Dequeue( )
21:         else // Synchronize its CQ buffer with AP
22:            if Receive a CQ_SYN then CQ_Update(CQ_SYN)
23:      end
```

Algorithm 3 specifies the transmission process (Node→AP), where each node transmits over the transmission subchannel. In this process, each node's transmission order follows the order of NodeIDs stored in the CQ buffer. While the CQ buffer is not empty, each node checks whether the head of the CQ buffer (CQ_Head) equals to NodeID. If yes, the node first sends a DATA frame upon the channel being idle for CIFS and next waits for the AP's response; if no, the node just waits for the AP's response passively. Both the node itself (i.e. the node in case 1, who matches the CQ_Head) and the other nodes (i.e. the nodes in case 2, who do not match the CQ_Head) need to handle the following three situations.

1. If there comes an ACK, nodes dequeue the current CQ_Head as the transmission has been finished.
2. If there comes a CQ_SYN frame (a frame contains the AP's own CQ buffer), it manifests that the AP has found some issues (e.g., out of synchronous or reaching the maximum retry limit) and needs to resynchronize all the CQ buffers. The nodes then update their CQ buffers according to the CQ_SYN (namely, resetting the CQ buffer to a new one obtained from CQ_SYN). In addition, the current transmitter also has to drop the frame being transmitted. (Note that it is a higher layer is responsible for retransmitting the dropped frame.)
3. If CQ_SYN timeout occurs (CQ_SYN timeout is a time longer than ACK timeout, namely, it is the case where nodes receive neither ACK nor CQ_SYN), since CQ_Head remains unchanged, the sender retransmits the DATA frame.

Algorithm 4: Transmission process (AP → Node)

```
01: while Receive a DATA frame
02:   if No errors in DATA then
03:      if DATA.SrcID == CQ_Head then
04:         Feed back an ACK; CQ_Dequeue( )
05:      else // Synchronize all CQ buffer forcibly
06:         Feed back a CQ_SYN
07:   else //Check RetryLimit for dequeue
08:      if RetryLimit < threshold then RetryLimit++
09:      else CQ_Dequeue( )
10:      // Synchronize all CQ buffers for each retransmission
11:      Feed back a CQ_SYN
```

Algorithm 4 specifies the transmission process (AP→Node), where the AP responds towards present transmission over the transmission subchannel. Upon receiving a DATA frame, the AP first uses the FCS field to check whether the frame is corrupted. If there are no errors, the AP then turns to compare its CQ_HEAD with DATA.SrcID (i.e. the DATA sender's ID). If they match, the AP feeds back an ACK and dequeues its CQ_HEAD to finish the transmission; otherwise it broadcasts a CQ_SYN frame to synchronize all the CQ buffers forcibly. If there is any error in DATA, the AP first checks RetryLimit (namely, the number of times that the corresponding node has retransmitted for). If RetryLimit reaches the threshold (the threshold being chosen by experience, in general), the AP infers that the corresponding channel may not be satisfactory, thus dequeuing CQ_HEAD (namely, dropping the corresponding node to release channel for other better-condition nodes) and broadcasting a CQ_SYN. If the RetryLimit is lower than threshold, the AP only broadcasts a CQ_SYN to let the node retransmit.

C. Optimal Subcarrier Allocation

In CSMA/CQ, the most important design issue is to optimize the data-subcarrier numbers, $N_c$ and $N_d$, of the contention and transmission subchannels, in a sense of maximizing the system throughput. To tackle this optimization problem, we first model the CSMA/CQ system as a queuing system, and then find the optimal solution. To facilitate the theoretical analysis, we assume that the CSMA/CQ system is in a saturation regime (where each node always has packets to transmit).

C.1 the Queuing1 Model

Figure 6:
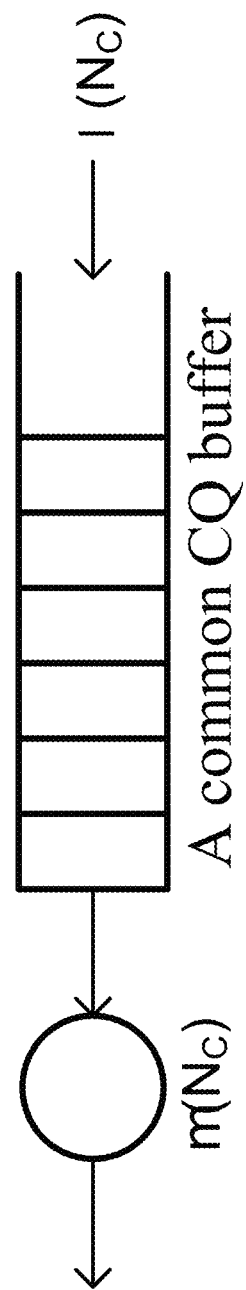
FIG. 6 is a queuing model used in determining an optimal subcarrier allocation for an CSMA/CQ system.

In CSMA/CQ, each node maintains a CQ buffer with the same information. Therefore, we can artificially assume that all nodes share a common CQ buffer. In the contention process, nodes contend for a transmission opportunity over the contention subchannel; the IDs of winners are then enqueued into the common CQ buffer. At the same time, in the transmission process, nodes (whose IDs are in the common CQ buffer) send frames in a sequential order over the transmission subchannel; upon a successful transmission, the ID of the sender is then dequeued from the common CQ buffer. The data-subcarrier number $N_c$ of the contention subchannel, which determines the data-subcarrier number $N_d=N-N_c$ of the transmission subchannel and determines the physical transmission rate, has an important impact on the enqueue and dequeue rates. Given a value of $N_c$, let $\lambda(N_c)$ and $\mu(N_c)$ represent the enqueue and dequeue rates, respectively, of the common CQ buffer. Then, we can model the CSMA/CQ system as a queuing system with an arrival rate $\lambda(N_c)$, a service rate $\mu(N_c)$, and an infinite buffer. FIG. 6 illustrates the queuing model for CSMA/CQ.

C.2 Enqueue Rate

In the contention process of CSMA/CQ, nodes use the standard RTS/CTS mechanism in DCF to contend for a transmission opportunity. The IDs of winners are then enqueued into the common CQ buffer. It follows that the enqueue rate $\lambda(N_c)$ is equal to the number of winners in a unit time, which is determined by the DCF protocol and the data-subcarrier number $N_c$ of the contention subchannel.

The enqueue rate $\lambda(N_c)$ is calculated based on the DCF performance analysis method [15], [16]. In what follows, the saturated attempt rate is first calculated, then the generic slot is defined, and finally the enqueue rate is obtained.

Saturated Attempt Rate.

Let $\beta$ and $\alpha$ represent a saturated attempt rate and a collision probability, respectively, for each node. Since the contention process follows the IEEE 802.11 DCF, one can calculate $(\beta, \alpha)$ as for IEEE 802.11 WLANs. From [16], $(\beta, \alpha)$ is uniquely governed by the following fixed-point equations:

$$\begin{cases} \beta = \dfrac{1+\alpha+\alpha^2+\ldots+\alpha^M}{b_0+\alpha b_1+\alpha^2 b_2+\ldots+\alpha^M b_M} \\ \alpha = 1-(1-\beta)^{n-1} \end{cases} \quad (1)$$

where: n is the number of contending nodes; M is the frame retry limit; $b_k$, the mean of the backoff count at stage k, is given by $b_k=2^k b_0$ for $0 \le k \le m-1$ and $b_k=2^m b_0$ for $m \le k \le M$, in which m determines the maximum backoff window size. In the IEEE 802.11 specification, $b_0=16$, $m=5$ and $M=7$.

Generic Slot.

Given a value of $N_c$, let $\Omega(N_c)$ represent the mean time that elapses for one decrement of the backoff counter in the DCF. Note that the backoff counter decreases by one for each idle time slot and is suspended when the channel is busy. It follows that $\Omega(N_c)$ is given by $$\Omega(N_c)=(1-p_{tr})\sigma+p_s T_s(N_c)+(p_{tr}-p_s)T_c(N_c), \quad (2)$$

where: $p_{tr}=1-(1-\beta)^n$ is the probability of a busy slot; $p_s=n\beta(1-\beta)^{n-1}$ is the successful transmission probability among n contending nodes; $\sigma$ is the duration of one time slot, $T_s(N_c)$ and $T_c(N_c)$ are, respectively, the successful and unsuccessful RTS/CTS handshaking times for a given $N_c$. It is easy to prove $p_s<p_{tr}$ since the successful transmission is a special case of the transmission process. Since the RTS/CTS handshaking mechanism follows the transmission pattern DIFS/RTS/SIFS/CTS, it follows that $T_s(N_c)$ is expressed as $$T_s(N_c)=T_{DIFS}+\dfrac{L_{RTS}+L_{CTS}}{R_b N_c}+T_{SIFS},$$

where: $T_{DIFS}$ and $T_{SIFS}$ represent a DIFS time and a SIFS time, respectively; $L_{RTS}$ and $L_{CTS}$ represent the lengths of the RTS and CTS frames, respectively; $R_b$ represents the physical transmission rate of each subcarrier, and $N_c$ represents the data-subcarrier number of the contention subchannel. Furthermore, we assume that $$T_c(N_c)=T_s(N_c). \quad (3)$$

The assumption is equivalent to assuming that the CTS timeout after a collision matches the guard time observed by non-colliding nodes.

Enqueue Rate.

the enqueue rate $\lambda(N_c)$ is defined to be the mean number of successfully transmitted RTS frames (which is $p_s$, since the system has 1 successful transmission with a probability $p_s$, and fails in transmission with a probability $1-p_s$), over the time duration of $\Omega(N_c)$. It follows that $$\lambda(N_c)=\dfrac{p_s}{\Omega(N_c)}. \quad (4)$$

C. 3 Dequeue Rate

In the transmission process of CSMA/CQ, nodes perform the TDMA-like transmission following the order that the node IDs are stored in the common CQ buffer; upon a successful transmission, the ID of the sender is then dequeued from the common CQ buffer. In the transmission process, each frame transmission follows the pattern: CIFS/Frame/SIFS/ACK. Therefore, the transmission time of each frame is given by $$T_{CIFS}+(T_h+T_p)+T_{SIFS}+T_{ACK}=T_{CIFS}+T_{SIFS}+T_h+T_p+T_{ACK}$$
$$=T_{CIFS}+T_{SIFS}+\dfrac{L_h+L_p+L_{ACK}}{R_b N_d}$$
$$=T_{CIFS}+T_{SIFS}+\dfrac{L_h+L_p+L_{ACK}}{R_b(N-N_c)},$$

where: $T_{CIFS} \in (T_{SIFS},T_{DIFS})$ is the CIFS time; $T_h+T_p$ is the frame transmission time consisting of the frame header time $T_h$ and the frame payload time $T_p$; $T_{SIFS}$ is the SIFS time; $T_{ACK}$ is the ACK time, which is the time needed to complete the ACK frame header transmission; $L_h$, $L_p$ and $L_{ACK}$ represent the lengths of the frame header, of the frame payload and of the ACK, respectively; $N_c$, $N_d$ and N represent the data-subcarrier numbers of the contention subchannel, of the transmission subchannel and of the whole channel, respectively; and $R_b$ is the physical transmission rate of each subcarrier.

Then, the dequeuing rate $\mu(N_c)$ is equal to the reciprocal of one frame transmission time, namely, $$\mu(N_c)=\dfrac{1}{T_{CIFS}+(T_h+T_p)+T_{SIFS}+T_{ACK}}= \quad (5)$$
$$\dfrac{1}{T_{CIFS}+T_{SIFS}+\dfrac{L_h+L_p+L_{ACK}}{R_b(N-N_c)}}.$$

C. 4 Optimal Subcarrier Allocation

In this subsection, the system throughput is defined and its formula is derived. Then the optimal subcarrier allocation that maximizes the system throughput is obtained.

Let $\Gamma(N_c)$ represent the system throughput (i.e. the number of successfully transmitted bits in a unit time) of the CSMA/CQ system. In case $\lambda(N_c)<\mu(N_c)$, the throughput is mainly constrained by $\lambda(N_c)$ (i.e. the total number of winners that are allowed to transmit data frames within a unit time). In other word, one gets $\Gamma(N_c)=\lambda(N_c) \times L_p$. In case $\lambda(N_c)>\mu(N_c)$, the throughput is mainly constrained by $\mu(N_c)$ (i.e. the capacity of the transmission subchannel). In this case, $\Gamma(N_c)=\mu(N_c) \times L_p$. Generalizing these two cases yields $$\Gamma(N_c)=L_p \times \min[\lambda(N_c),\mu(N_c)]. \quad (6)$$

Since $\Gamma(N_c)$ is governed by the value of $N_c$, it is desired to find the optimal value of $N_c$, denoted as $N_{c,opt}$, that maximizes $\Gamma(N_c)$. It follows that $$N_{c,opt}=\operatorname*{argmax}_{0 \le N_c \le N}\Gamma(N_c) \quad (7)$$
$$=\operatorname*{argmax}_{0 \le N_c \le N}(L_p \times \min[\lambda(N_c),\mu(N_c)])$$
$$=\operatorname*{argmax}_{0 \le N_c \le N}(\min[\lambda(N_c),\mu(N_c)]).$$

Theorem 1 below proves the existence and uniqueness of $N_{c,opt}$, and expresses $N_{c,opt}$ in terms of system parameters.

Theorem 1:

For CSMA/CQ, the optimal data-subcarrier number $N_{c,opt}$ of the contention subchannel is given by $$N_{c,opt}=\dfrac{(aN-b-c)+\sqrt{(aN-b-c)^2+4abN}}{2a}, \quad (8)$$

-continued where $$a = (1 - p_{tr})\sigma + p_{tr}(T_{DIFS} + T_{SIFS}) - p_s(T_{CIFS} + T_{SIFS}),$$

$$b = \frac{p_{tr}(L_{RTS} + L_{CTS})}{R_b} > 0$$

and $$c = \frac{(L_h + L_p + L_{ACK})p_s}{R_b} > 0.$$

In addition, $N_{c,opt}$ is in the range of $0 < N_{c,opt} < N$.

Proof:

Please refer to the Section C.4.1.

The following remarks regarding Theorem 1 are made.

Remark (a):

Intuitively, maximizing $\Gamma(N_c)$ requires that the enqueue rate should be equal to the dequeue rate, namely, $\lambda(N_c)=\mu(N_c)$. Note that $\lambda(N_c) \propto N_c$ and $\mu(N_c) \propto 1/N_c$. That is, as $N_c$ increases, $\lambda(N_c)$ increases but $\mu(N_c)$ decreases. The reasons are explained as follows.

When $\lambda(N_c) > \mu(N_c)$, namely, when the enqueue rate is greater than the dequeue rate, it means that a lot of nodes succeed in channel contention but cannot transmit their data. It implies that when the total resources are fixed (that is, $N_c$ is fixed), more resources are allocated to the contention subchannel than to the transmission subchannel. In this situation, the system throughput is constrained by the capacity of the transmission subchannel. As a result, over-allocation of resources to the contention subchannel is a waste.

When $\lambda(N_c) < \mu(N_c)$, namely, when the enqueue rate is less than the dequeue rate, it means that the number of the winners is small so that the transmission subchannel is often idle. It implies that when the total resources are fixed, more resources are allocated to the transmission subchannel than to the contention subchannel. In this situation, the system throughput is constrained by the capacity of the contention subchannel. It follows that over-allocation of the resources to the transmission subchannel becomes a waste.

In short, letting $\lambda(N_c)=\mu(N_c)$ can balance the capacities of the contention subchannel and of the transmission subchannel, thus maximally utilizing the system resources and producing the maximum system throughput.

Remark (b):

In practice, the data-subcarrier number of the contention subchannel is a positive integer. Therefore, the data-subcarrier number of the contention subchannel for optimal subcarrier allocation, denoted as $N'_c$, should be calculated by $$N'_c = q[N_{c,opt}] \quad (9)$$

where $q[x]$ is a rounding function for rounding x to an integer. In particular, $q[x]$ is such that $|x-q[x]|<1$. One practical choice of $q[x]$ is a floor function, which rounds x to the largest integer less than or equal to x. When the floor function is selected, $N'_c$ is determined as $N'_c := \lfloor N_{c,opt} \rfloor$ where $\lfloor \cdot \rfloor$ is the floor function. Another choice of $q[x]$ is a ceiling function. Note that if the calculated value of $N'_c$ by (9) is 0 or N, it means that in practice, the optimal subcarrier allocation for the CSMA/CQ system under consideration does not exist. After $N'_c$ is obtained by (9), the data-subcarrier number of the transmission subchannel for optimal subcarrier allocation, denoted as $N'_d$, is computed by $$N'_d = N - N'_c \quad (10)$$

C.4.1 Proof of Theorem 1

Note that as $N_c \in [0,N]$ increases, $\lambda(N_c)$ increases but $\mu(N_c)$ decreases. Theorem 1 is proved in a two-step approach.

Step 1: This step is to show that $N_{c,opt} \in (0, N)$ is the unique intersection point between curves $\lambda(N_c)$ and $\mu(N_c)$. From (2)-(3), (4) and (5), we have that $$\Omega(N_c) = (1 - p_{tr})\sigma + p_s T_s(N_c) + (p_{tr} - p_s)T_c(N_c)$$
$$= (1 - p_{tr})\sigma + p_{tr}T_s(N_c)$$
$$= (1 - p_{tr})\sigma + p_{tr} \times \left(T_{DIFS} + \frac{L_{RTS} + L_{CTS}}{R_b R_c} + T_{SIFS}\right)$$
$$= (1 - p_{tr})\sigma + p_{tr} \times (T_{DIFS} + T_{SIFS}) + \frac{p_{tr}(L_{RTS} + L_{CTS})}{R_b} \frac{1}{N_c},$$

$$\lambda(N_c) = \frac{p_s}{\Omega(N_c)} = \frac{p_s}{\sigma + p_{tr}(T_{DIFS} + T_{SIFS}) + \frac{p_{tr}(L_{RTS} + L_{CTS})}{R_b} \frac{1}{N_c}},$$

and $$\mu(N_c) = \frac{1}{(T_{CIFS} + T_{SIFS}) + \frac{L_h + L_p + L_{ACK}}{R_b} \frac{1}{N - N_c}}.$$

To find the intersection point of the two curves, let $\lambda(N_c)=\mu(N_c)$. After some algebraic manipulations, one gets $$-aN_c^2 + (aN-b-c)N_c + bN = 0.$$

Solving this equation gives $$N_{c,opt} = \frac{(aN - b - c) \pm \sqrt{(aN - b - c)^2 + 4abN}}{2a}.$$

On one hand, we have that $$\frac{(aN - b - c) - \sqrt{(aN - b - c)^2 + 4abN}}{2a} < \frac{(aN - b - c) - |aN - b - c|}{2a} \leq 0.$$

On the other hand, $$\frac{(aN - b - c) + \sqrt{(aN - b - c)^2 + 4abN}}{2a} > \frac{(aN - b - c) + |aN - b - c|}{2a} \geq 0.$$

In addition, it is noted that $$4abN < 4aN(b+c) \Rightarrow -2aN(b+c) + 4abN < 2aN(b+c) \Rightarrow$$
$$(aN - b - c)^2 + 4abN < (aN + b + c)^2 \Rightarrow$$
$$\sqrt{(aN - b - c)^2 + 4abN} < aN + b + c \Rightarrow$$
$$(aN - b - c) + \sqrt{(aN - b - c)^2 + 4abN} < 2aN \Rightarrow$$
$$\frac{(aN - b - c) + \sqrt{(aN - b - c)^2 + 4abN}}{2a} < N.$$

Since the data-subcarrier number is positive, $N_{c,opt}$ should be expressed by (8). In short, $N_{c,opt} \in (0,N)$ is the unique intersection point between curves $\lambda(N_c)$ and $\mu(N_c)$.

Step 2: This step is to show that $N_{c,opt}$ is the unique value that maximizes the system throughput of CSMA/CQ. Note that $\lambda(N_c)$ increases monotonically and $\mu(N_c)$ decreases monotonically in $N_c \in [0,N]$, while $N_{c,opt} \in (0,N)$ is the unique intersection point between the curves of $\lambda(N_c)$ and $\mu(N_c)$. Therefore, we have that $\lambda(N_{c,opt}) = \mu(N_{c,opt})$. When $N_c \leq N_{c,opt}$, we have that $\lambda(N_c) \leq \lambda(N_{c,opt})$ and $\mu(N_{c,opt}) \leq \mu(N_c)$. Hence, $$\max_{0 \leq N_c \leq N_{c,opt}} (\min[\lambda(N_c), \mu(N_c)]) = \max_{0 \leq N_c \leq N_{c,opt}} \lambda(N_c) = \lambda(N_{c,opt}) = \mu(N_{c,opt}).$$

When $N_c \geq N_{c,opt}$, we have that $\lambda(N_c) \geq \lambda(N_{c,opt})$ and $\mu(N_{c,opt}) \geq \mu(N_c)$. It follows that $$\max_{N_{c,opt} \leq N_c \leq N} (\min[\lambda(N_c), \mu(N_c)]) = \max_{N_{c,opt} \leq N_c \leq N} \mu(N_c) = \mu(N_{c,opt}).$$

Then from (7), $N_{c,opt}$ is the unique value that maximizes the system throughput of the CSMA/CQ system.

D. Performance Evaluation

The performance of CSMA/CQ is evaluated by simulation. The CSMA/CQ simulator was written using C++. The parameters used are shown in Table I. In this table, the OFDM symbol time $\tau$ is set to 4 μs, which consists of the valid symbol time of 3.2 μs and a cyclic prefix time of 0.8 μs. Similar to the parameter setting used in the IEEE 802.11g specification, it is assumed that the system has N=48 data subcarriers, which supports a data rate of 54 Mbps. It follows that the per-subcarrier data rate is $R_b$=54/48=1.125 Mbps. Each simulation value was obtained by averaging over five simulation runs, where each run lasted for 100 seconds.

TABLE I

Parameters used in simulation.

| | |
|---|---|
| n | 20 |
| N | 48 |
| $N_c$ | 6 |
| $N_d$ | 42 |
| τ | 4 μs |
| σ | 20 μs |
| SIFS | 12 μs |
| CIFS | 12 μs |
| DIFS | 52 μs |
| $R_b$ | 1.125 Mbps |
| PHY Header | 26 bytes |
| MAC Header | 28 bytes |
| RTS | 20 bytes |
| CTS | 14 bytes |
| ACK | 14 bytes |
| DATA | 1000 bytes |

Figure 7:
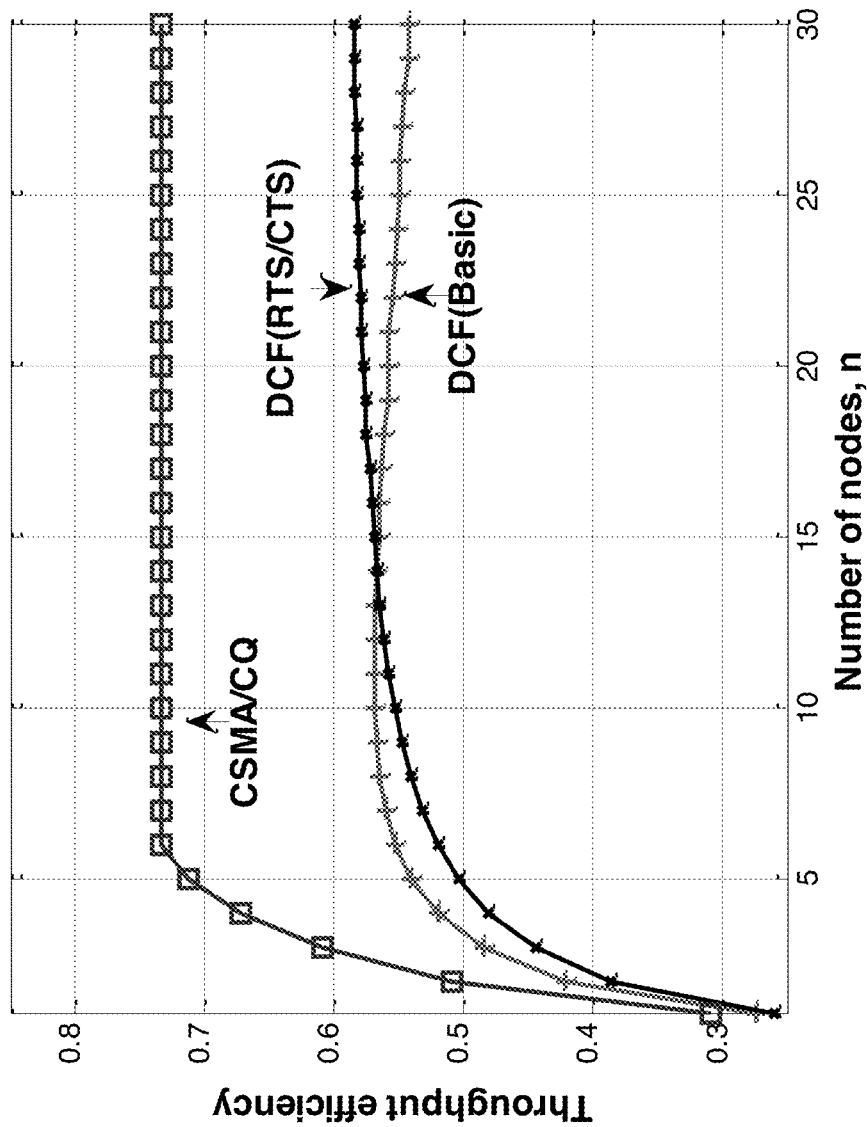
FIG. 7 provides a comparison of throughput efficiency among CSMA/CQ, DCF with the basic access mode, and DCF with the RTS/CTS mode.

FIG. 7 compares the simulation results of the throughput efficiency (i.e. the ratio between the network throughput and the PHY data rate) among CSMA/CQ, DCF with the RTS/CTS mode, DCF with the basic access mode, when the number of nodes, n, varies from 1 to 30, and $N_c$: $N_d$ is 6:42. From FIG. 7, the following observations are made.

The throughput efficiency of CSMA/CQ first quickly increases to a maximum value and then keeps almost unchanged, as the number of nodes, n, increases. Moreover, the throughput efficiency always outperforms the corresponding ones of the other two protocols. A rough calculation shows that CSMA/CQ has a potential of improving the throughput efficiency by 24% over the IEEE 802.11 DCF with the RTS/CTS mode and by 33% over the IEEE 802.11 DCF with the basic mode. For example, when n=30, the efficiency values of CSMA/CA, of DCF with the RTS/CT mode and of DCF with the basic mode are 0.73, 0.59 and 0.55, respectively. The reason of the improvement by CSMA/CQ is that when a collision happens, only the contention subchannel collapses in the CSMA/CQ scheme, while the whole channel collapses for the other two protocols.

The efficiency of DCF with the basic access mode first increases and then decreases as n increases. The reason is that more contending nodes cause more collisions of the DATA frames (rather than the short RTS frame in CSMA/CQ and in DCF with the RTS/CTS mode), thereby wasting more time.

Figure 8:
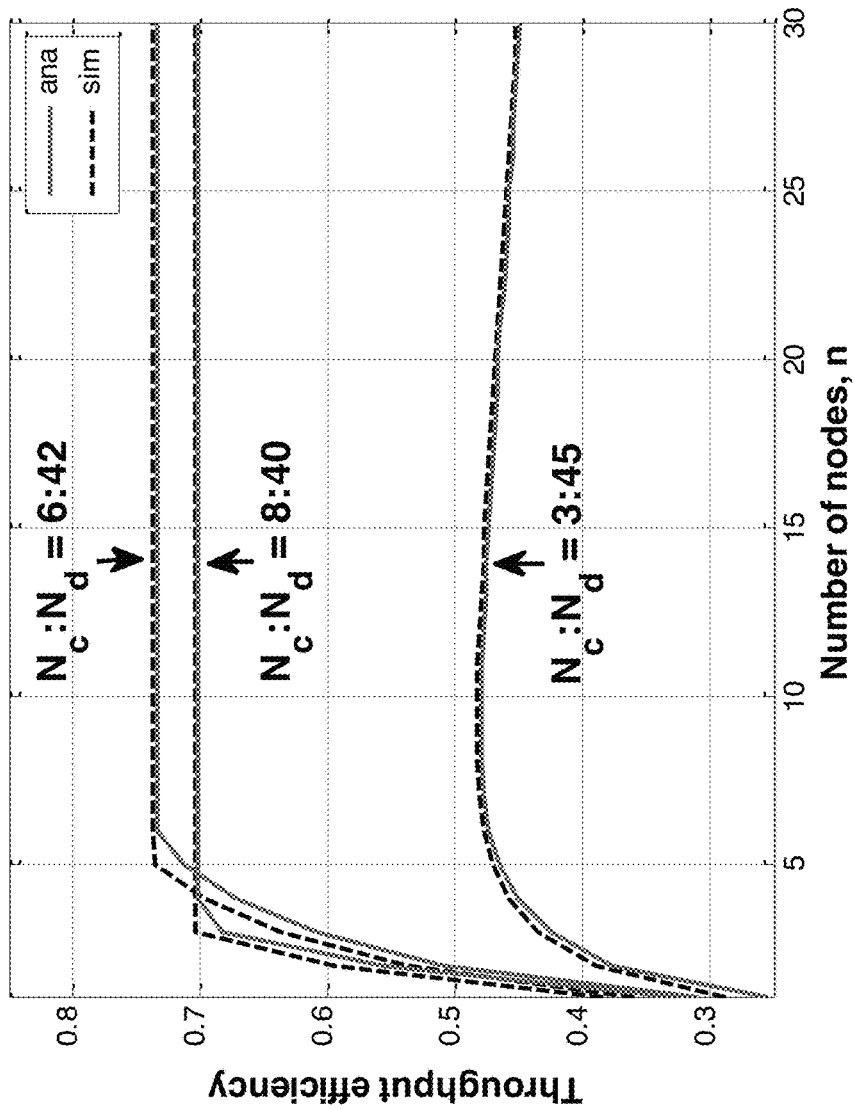
FIG. 8 plots the throughput efficiency of CSMA/CQ as the ratio $N_c:N_d$ varies, where $N_c$ and $N_d$ denote the numbers of data subcarriers in a contention subchannel and in a transmission subchannel, respectively.

FIG. 8 plots the throughput efficiency, when the number of nodes, n, varies from 1 to 30 for each of the ratios of $N_c$: $N_d$ given by 3:45, 6:42 and 8:40. From FIG. 8, when n is fixed (say, n=10), the efficiency first increases and then decreases as $N_c$ increases (for example, the efficiencies being 0.48, 0.73 and 0.7 respectively when $N_c$=3, 6, 8). It indicates that for a given N, there exists an optimal subcarrier allocation. The reason is that for a given N, increasing $N_c$ decreases $N_d$. As a result, increasing $N_c$ increases the capacity of the contention subchannel but decreases the capacity of the transmission subchannel, and vice versa. However, the throughput is constrained by the minimum of the two capacities, as shown in (6). It follows that a smaller $N_c$ or a lager $N_c$ results in a low throughput and hence there exists an optimal $N_c$ that maximizes the system throughput.

Figure 9:
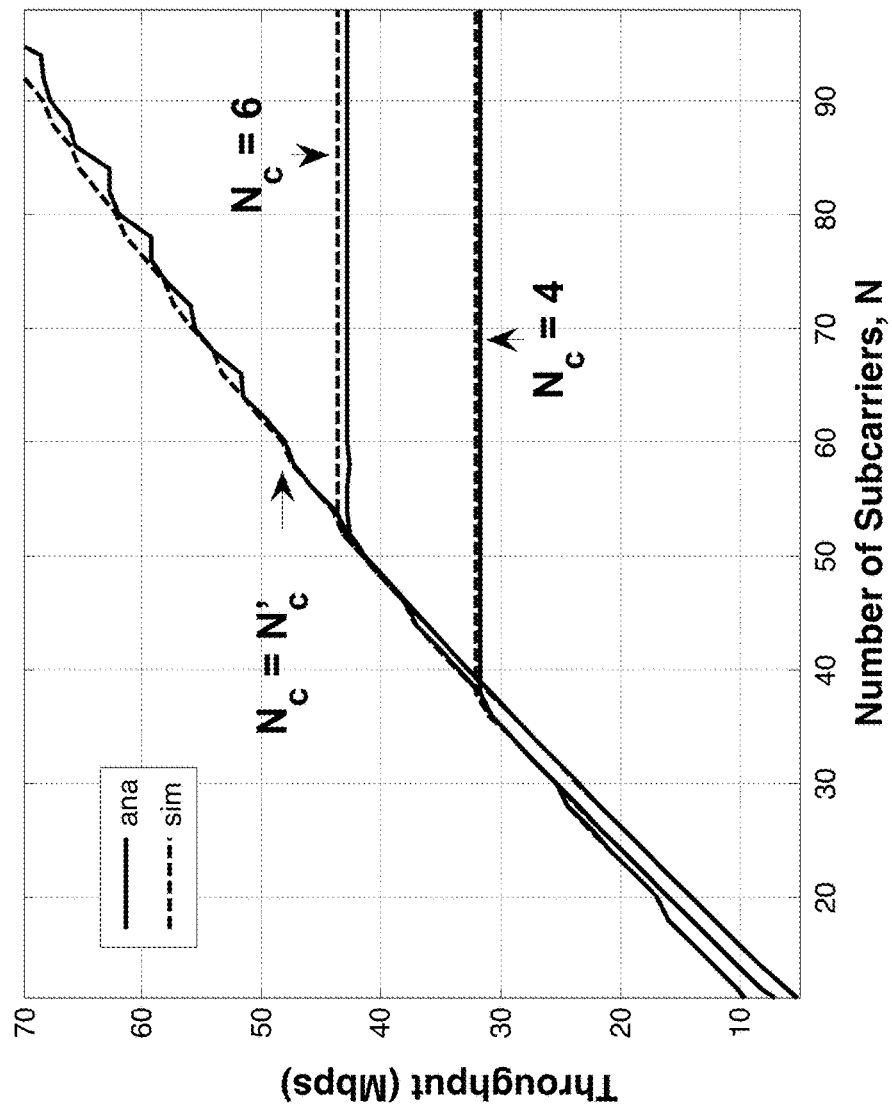
FIG. 9 plots the throughput against the total number of data subcarriers $N=N_c+N_d$, when the number of nodes n is 20 under a value of $N_c$ selected from 4, 6 and $N'_c$, where $N'_c$ is the optimal $N_c$ value that maximizes the throughput.

FIG. 9 plots the throughput (in Mbps), when the number of total subcarriers, N, varies from 11 to 98 for each case of $N_c$ being 4, 6 and $N'_c$ under n=20, where $N'_c$ is computed from $N_{c,opt}$ by (9) with $q\lfloor \cdot \rfloor$ being a floor function. The solid curves in FIG. 9 show the analysis results, and the dash curves therein show the simulation results. From FIG. 9, the following observations are made.

When $N_c$ is fixed, the throughput first increases to a maximum value and then keeps almost unchanged, as N increases. For example, when $N_c$=4, the throughput increases to the maximum value of 31 Mbps, and then keeps unchanged, as N increases. The reason is that when $N_c$ is fixed, increasing N only increases $N_d$. It indicates that as N increases, the capacity of the contention subchannel keeps unchanged, but the capacity of the transmission subchannel increases, as shown in (5). However, the system throughput is constrained by the minimum of the two capacities, as shown in (6). Therefore, below a critical value of N (say, N=36 for $N_c$=4), the system throughput is constrained by $N_d$ and keep increasing. Above the critical value, the system throughput is constrained by $N_c$ and keeps unchanged.

When $N_c$ is set to the optimal value $N'_c$, the system throughput keeps increasing as N increases. The reason is that as N increases, $N_c$ and $N_d$ increase simultaneously, implying that the two capacities of the contention subchannel and of the transmission subchannel increase simultaneously, so that the system throughput keeps increasing.

In addition, from FIG. 9, the analysis results match well with the corresponding simulation results. A rough calculation reveals that the relative errors between the analysis and simulation results are, respectively, 0.80%, 1.11% and 0.79%, when $N_c$ values are 4, 6 and $N'_c$. It manifests that the theoretical model is very accurate.

Figure 10:
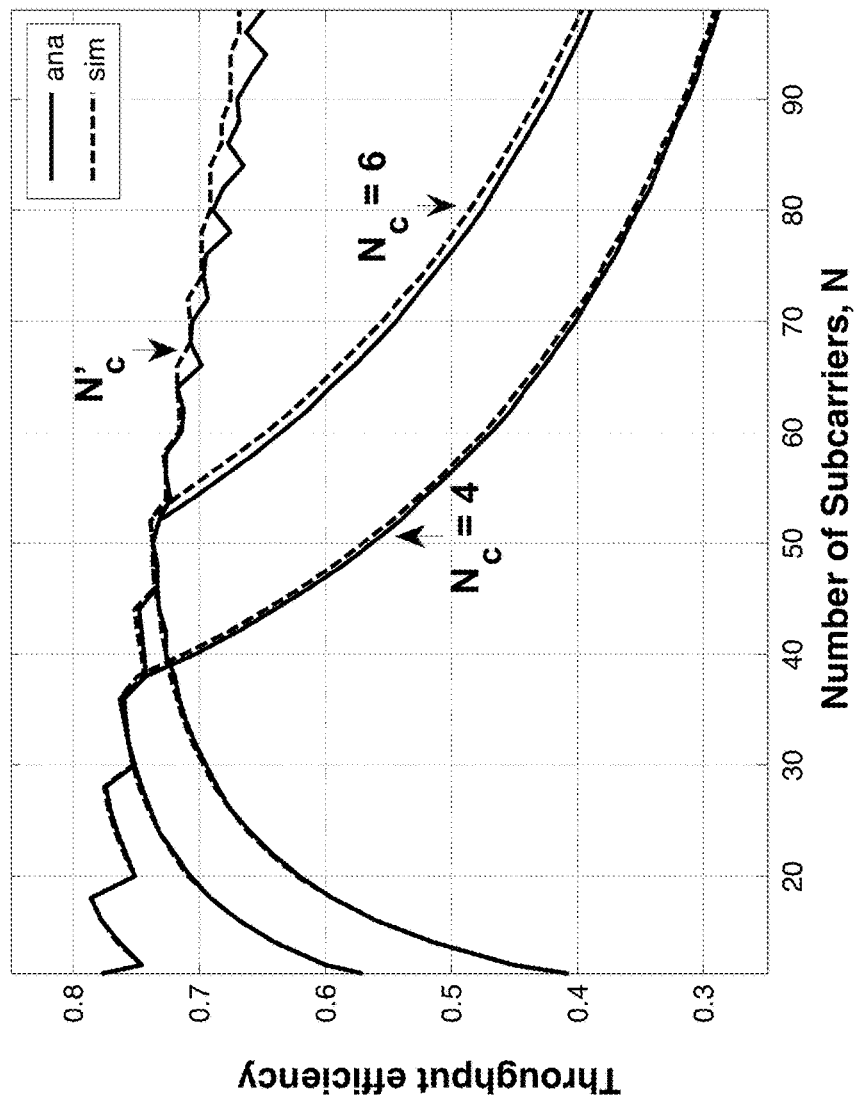
FIG. 10 plots the throughput efficiency against the total number of subcarriers N, when n is 20 under a value of $N_c$ selected from 4, 6 and $N'_c$.

FIG. 10 repeats FIG. 9 except that the y-axis represents the throughput efficiency (i.e. the ratio between the throughput and the PHY data rate). From FIG. 10, the following observations are made.

When $N_c$ is fixed, the throughput efficiency first increases to a maximum value and then decreases, as N increases. For example, when $N_c=4$, the efficiency first increases to 0.76 and then decreases, as N increases. Note that the PHY data rate increase as N increases. The reasons are as follows. Below a critical value of N (say, N=36 when $N_c=4$), the system throughput is constrained by $N_d$ and increases as N increases; at the same time the proportion of the system spending in packet transmission increases as the PHY data rate increases. Above the critical value, the system throughput is constrained by $N_c$ and keeps unchanged; therefore, the throughput efficiency (i.e. the ratio between the throughput and the PHY data rate) decreases, as the PHY data rate increases.

When $N_c$ is set to the optimal value $N'_c$, the throughput efficiency has a decreasing trend, as N increases. The reasons are as follows. Note that the inherent overheads (such as the DIFS and the waiting time) keep unchanged, as N increases. In the optimal subcarrier allocation, as N increases (and hence the PHY data rate increases), the packet transmission time decreases but the overhead keeps unchanged. As a result, the throughput efficiency decreases. It indicates that when the PHY data rate increases, the throughput increases. However, the increment in the throughput is not as much as the increment in the PHY date rate. In order to obtain the commensurate increment in the throughput, the inherent overhead (such as the waiting time overhead in the contention subchannel) should be reduced.

Figure 11:
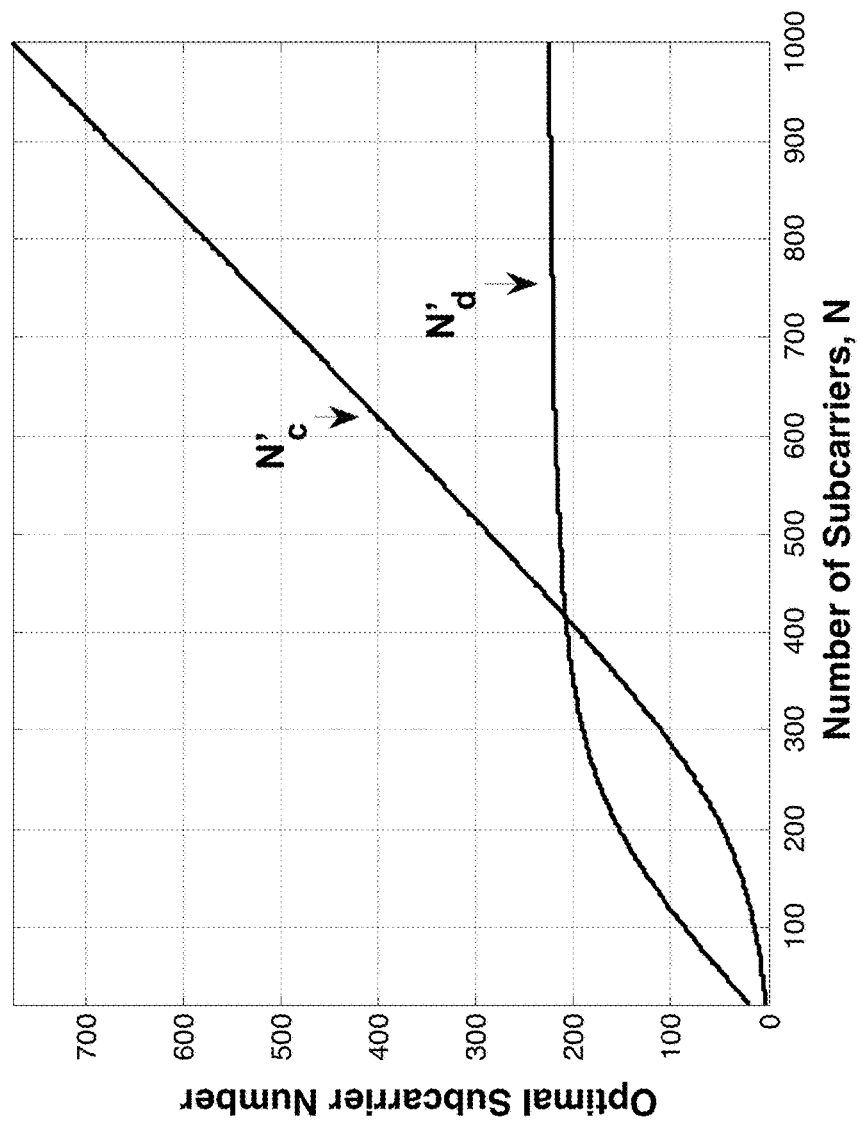
FIG. 11 plots the optimal contention data-subcarrier number, $N'_c$, and the optimal transmission data-subcarrier number, $N'_d$, against N for n=20.

FIG. 11 plots the optimal data-subcarrier numbers, $N'_c$ and $N'_d$, as the total subcarrier number N increases, where $N'_c$ is calculated from $N_{c,opt}$ by (9) with $q\lfloor \bullet \rfloor$ being a floor function. From FIG. 11, one can see that as N becomes larger and larger, $N'_d$ increases very slowly but $N'_c$ increases very fast. The main reason is that the time-domain contention efficiency quickly converges to a limit (say, 0.371163 when the packet size is 1000 bytes, [17]), but the transmission efficiency still undergoes an approximately proportional increase as revealed from (5), when the PHY data rate increases. However, the system throughput is constrained by the minimum throughput efficiency of the two processes, as shown in (6). As a result, the system is required to allocate far more subcarriers to the contention subchannel than to the transmission subchannel, trading for increasing the system efficiency a little. It indicates that when the number of the total available subcarriers increases, the system efficiency limit is mainly constrained by the contention process. One can either improve the time-domain contention efficiency via some certain method (say, the idle sense scheme [10]) or replace the time-domain contention mechanism by the frequency-domain contention mechanism (such as T2F [7] and Back2F [9]) in order to improve the system throughput efficiency of CSMA/CQ significantly.

E. The Present Invention

The present invention is developed based on the CSMA/CQ technique and an implementation thereof as disclosed in Sections B and C above.

An aspect of the present invention is to provide a method for enabling a plurality of nodes to communicate with an AP over a multiple-access channel. The channel includes a contention subchannel and a transmission subchannel. In addition, the contention subchannel and the transmission subchannel are separate from each other. Each of the nodes has a node ID for identification. Each of the AP and the nodes has an individual CQ buffer for storing a waiting queue of the node IDs of the nodes each already granted with a right of data transmission by the AP.

Exemplarily, the method is illustrated as follows. For a first node that is one of the nodes, when the first node has data to be sent to the AP, the first node contends for the right of data transmission until the AP grants the right of data transmission to the first node. In particular, the first node contends for the right by communicating with the AP on the contention subchannel. When the AP grants the right to the first node, each of the AP and the nodes enqueues the CQ buffer thereof with the node ID of the first node. When the node ID of the first node in the waiting queue of the first node's CQ buffer has a position such that the first node is permitted to send out the data thereof to the AP, the first node transmits the data thereof to the AP over the transmission subchannel. When data transmission from the first node to the AP completes, each of the AP and the nodes dequeues from the CQ buffer thereof the node ID of the first node.

The method may further include one or more of the following options.

When data transmission from the first node to the AP completes, the AP may broadcast an ACK to all the nodes so as to inform each of the nodes to perform the dequeuing of the node ID of the first node from the CQ buffer thereof.

When the AP detects that the CQ buffers of all the nodes and the AP are not synchronized, the AP may broadcast the CQ buffer of the AP to the nodes so as to resynchronize the CQ buffers of all the nodes with the CQ buffer of the AP.

When the CQ buffers of all the nodes and the AP are synchronized and are not empty, there are one or more second nodes having the node IDs thereof in the waiting queue of any of the CQ buffers. The one or more second nodes may transmit the data thereof to the AP in a sequential manner of one second node by another second node such that the order of the one or more second nodes in data transmission follows the order of the node IDs in the waiting queue.

The waiting queue may be a first-in first-out queue.

In one practical implementation of performing the contending for the right of data transmission by the first node, the first node sends a RTS to the AP over the contention subchannel, and repeats the sending of the RTS to the AP until the AP transmits a clear to send (CTS) on the contention subchannel to declare that the AP grants the right of data transmission to the first node. Before performing the sending of the RTS, preferably the first node senses the contention subchannel to determine whether the contention subchannel has been idle for a pre-determined value of DIFS so as to determine whether or not to immediately send out the RTS over the contention subchannel. For example, the value of DIFS may be determined from the IEEE 802.11 standard if the disclosed method is applied to a WLAN compliant to this standard. If the contention subchannel is sensed not to have been idle for the DIFS, the contention subchannel is sensed again after a backoff duration determined according to a BEB algorithm. Otherwise, the sending of the RTS is performed.

For a communication system that implements the disclosed method, the system may be designed to employ OFDM in data communications between the AP and each of the nodes. It follows that the multiple-access channel is an OFDM channel including a plurality of data subcarriers. The contention subchannel and the transmission subchannel may include a first number and a second number of the data subcarriers, respectively, where the data subcarriers of the contention subchannel do not overlap with those of the transmission subchannel.

It is highly preferable that the data-subcarrier numbers of the contention subchannel and of the transmission subchannel are selected to maximize the system throughput. To achieve this goal, the nodes are first arranged to have a common timing-synchronization reference such that: (a) time is segmented into time segments of a fixed length equal to one OFDM symbol time; and (b) when any of the nodes has an OFDM symbol transmitted on either the contention subchannel or the transmission subchannel, the OFDM symbol is time-aligned with one of the time segments. Then allocate $N'_c$ data subcarriers to the contention subchannel and $N'_d$ data subcarriers to the transmission subchannel for OFDM-signal transmission, where $N'_c$ and $N'_d$ are computed by (9) and (10), respectively. Note that $N'_c$ is an integer determined according to $N_{c,opt}$ computed by (8) such that $|N'_c - N_{c,opt}|$ is less than 1.

Advantageously, the disclosed method is usable in a WLAN comprising the AP and the plurality of nodes. Preferably, each of the AP and the nodes has at least two antennas such that one antenna is used for communication over the contention subchannel and another antenna is for communication over the transmission subchannel.

In the embodiments disclosed herein, an AP or a node may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for enabling a plurality of nodes to communicate with an access point (AP) over a multiple-access channel, the channel including a contention subchannel and a transmission subchannel both of which are separate from each other, each of the nodes having a node identity (ID) for identification, each of the AP and the nodes having an individual contention queue (CQ) buffer for storing a waiting queue of the node IDs of the nodes each already granted with a right of data transmission by the AP, the method comprising:

when a first node being one of the nodes has data to be sent to the AP, contending, by the first node, for the right of data transmission until the AP grants the right of data transmission to the first node, wherein the first node contends for the right by communicating with the AP on the contention subchannel;

when the AP grants the right to the first node, enqueuing, by each of the AP and the nodes, the CQ buffer thereof with the node ID of the first node;

when the node ID of the first node in the waiting queue of the first node's CQ buffer has a position such that the first node is permitted to send out the data thereof to the AP, transmitting, by the first node, the data of the first node to the AP over the transmission channel;

when data transmission from the first node to the AP completes, dequeuing, by each of the AP and the nodes, from the CQ buffer thereof the node ID of the first node; and when the CQ buffers of all the nodes and the AP are synchronized and are not empty, transmitting, by one or more second nodes having the node IDs thereof in the waiting queue of any of the CQ buffers, the data of the one or more second nodes to the AP in a sequential manner of one second node by another second node such that the order of the one or more second nodes in data transmission follows the order of the node IDs in the waiting queue.

2. The method of claim 1, further comprising:

arranging the nodes to have a common timing-synchronization reference such that time is segmented into time segments of a fixed length equal to one orthogonal frequency division multiplexing (OFDM) symbol time and such that when any of the nodes has an OFDM symbol transmitted on either the contention subchannel or the transmission subchannel, the OFDM symbol is time-aligned with one of the time segments; and allocating $N'_c$ data subcarriers to the contention subchannel and $N'_d$ data subcarriers to the transmission subchannel for OFDM-signal transmission, $N'_d$ being computed by $N'_d = N - N'_c$, N being the number of data subcarriers in the channel, wherein $N'_c$ is an integer determined according to $N_{c,opt}$ such that $|N'_c - N_{c,opt}|$ is less than 1, $N_{c,opt}$ being computed by $$N_{c,opt} = \frac{(aN - b - c) + \sqrt{(aN - b - c)^2 + 4abN}}{2a}$$

where:

$a = (1 - p_{tr})\sigma + p_{tr}(T_{DIFS} + T_{SIFS}) - p_s(T_{CIFS} + T_{SIFS});$ $b = \frac{p_{tr}(L_{RTS} + L_{CTS})}{R_b};$ $c = \frac{(L_h + L_p + L_{ACK})p_s}{R_b};$ $p_{tr}$ is a probability that an individual time slot is busy, the individual time slot being formed by dividing time into a series of time slots;

$p_s$ is a successful transmission probability of an individual node;

$\sigma$ is a duration of one time slot;

$T_{DIFS}$ is a distributed coordination function inter-frame space (DIFS) time;

$T_{SIFS}$ is a short inter-frame space (SIFS) time;

$L_{RTS}$ is a length of a request to send (RTS) frame;

$L_{CTS}$ is a length of a clear to send (CTS) frame;

$R_b$ is a physical transmission rate of each data subcarrier;

$T_{CIFS} \in (T_{SIFS}, T_{DIFS})$ is a contention queuing inter frame spacing (CIFS) time;

$T_{ACK}$ is an acknowledgement (ACK) time;

$L_h$ is a length of a frame header;

$L_p$ is a length of a frame payload; and $L_{ACK}$ is a length of an ACK.

3. The method of claim 2, wherein $N'_c$ is determined as $N'_c = \lfloor N_{c,opt} \rfloor$ where $\lfloor \cdot \rfloor$ is a floor function.

4. The method of claim 1, wherein the contending for the right of data transmission by the first node comprises:

sending a request to send (RTS) to the AP over the contention subchannel; and repeating the sending of the RTS to the AP until the AP transmits a clear to send (CTS) on the contention subchannel to declare that the AP grants the right of data transmission to the first node.

5. The method of claim 4, wherein the contending for the right of data transmission by the first node further comprises:

before performing the sending of the RTS, sensing the contention subchannel to determine whether the contention subchannel has been idle for a pre-determined value of distributed-coordination-function inter-frame space (DIFS) so as to determine whether or not to immediately send out the RTS over the contention subchannel;

responsive to sensing that the contention subchannel has not been idle for the DIFS, re-performing the sensing of the contention subchannel after a backoff duration determined according to a binary exponential backoff (BEB) algorithm; and responsive to sensing that the contention subchannel has been idle for the DIFS, performing the sending of the RTS.

6. The method of claim 1, further comprising:

when data transmission from the first node to the AP completes, broadcasting, by the AP, an ACK to all the nodes so as to inform each of the nodes to perform the dequeuing of the node ID of the first node from the CQ buffer thereof.

7. The method of claim 1, further comprising:

when the AP detects that the CQ buffers of all the nodes and the AP are not synchronized, broadcasting, by the AP, the CQ buffer of the AP to the nodes so as to resynchronize the CQ buffers of all the nodes with the CQ buffer of the AP.

8. The method of claim 1, wherein the waiting queue is a first-in first-out queue.

9. A method for enabling a plurality of nodes to communicate with an access point (AP) over a multiple-access channel, the channel including a contention subchannel and a transmission subchannel both of which are separate from each other, each of the nodes having a node identity (ID) for identification, each of the AP and the nodes having an individual contention queue (CQ) buffer for storing a waiting queue of the node IDs of the nodes each already granted with a right of data transmission by the AP, the method comprising:

when a first node being one of the nodes has data to be sent to the AP, contending, by the first node, for the right of data transmission until the AP grants the right of data transmission to the first node, wherein the first node contends for the right by communicating with the AP on the contention subchannel;

when the AP grants the right to the first node, enqueuing, by each of the AP and the nodes, the CQ buffer thereof with the node ID of the first node;

when the node ID of the first node in the waiting queue of the first node's CQ buffer has a position such that the first node is permitted to send out the data thereof to the AP, transmitting, by the first node, the data of the first node to the AP over the transmission channel;

when data transmission from the first node to the AP completes, dequeuing, by each of the AP and the nodes, from the CQ buffer thereof the node ID of the first node;

arranging the nodes to have a common timing-synchronization reference such that time is segmented into time segments of a fixed length equal to one orthogonal frequency division multiplexing (OFDM) symbol time and such that when any of the nodes has an OFDM symbol transmitted on either the contention subchannel or the transmission subchannel, the OFDM symbol is time-aligned with one of the time segments; and allocating $N'_c$ data subcarriers to the contention subchannel and $N'_d$ data subcarriers to the transmission subchannel for OFDM-signal transmission, $N'_d$ being computed by $N'_d = N - N'_c$, N being the number of data subcarriers in the channel, wherein $N'_c$ is an integer determined according to $N_{c,opt}$ such that $|N'_c - N_{c,opt}|$ is less than 1, $N_{c,opt}$ being computed by $$N_{c,opt} = \frac{(aN - b - c) + \sqrt{(aN - b - c)^2 + 4abN}}{2a}$$

where:

$$a = (1 - p_{tr})\sigma + p_{tr}(T_{DIFS} + T_{SIFS}) - p_s(T_{CIFS} + T_{SIFS});$$

$$b = \frac{p_{tr}(L_{RTS} + L_{CTS})}{R_b};$$

$$c = \frac{(L_h + L_p + L_{ACK})p_s}{R_b};$$

$p_{tr}$ is a probability that an individual time slot is busy, the individual time slot being formed by dividing time into a series of time slots;

$p_s$ is a successful transmission probability of an individual node;

$\sigma$ is a duration of one time slot;

$T_{DIFS}$ is a distributed coordination function inter-frame space (DIFS) time;

$T_{SIFS}$ is a short inter-frame space (SIFS) time;

$L_{RTS}$ is a length of a request to send (RTS) frame;

$L_{CTS}$ is a length of a clear to send (CTS) frame;

$R_b$ is a physical transmission rate of each data subcarrier;

$T_{CIFS} \in (T_{SIFS}, T_{DIFS})$ is a contention queuing inter frame spacing (CIFS) time;

$T_{ACK}$ is an acknowledgement (ACK) time;

$L_h$ is a length of a frame header;

$L_p$ is a length of a frame payload; and $L_{ACK}$ is a length of an ACK.

10. The method of claim 9, wherein $N'_c$ is determined as $N'_c = \lfloor N_{c,opt} \rfloor$ where $\lfloor \cdot \rfloor$ is a floor function.

11. The method of claim 9, wherein the contending for the right of data transmission by the first node comprises:

sending a request to send (RTS) to the AP over the contention subchannel; and repeating the sending of the RTS to the AP until the AP transmits a clear to send (CTS) on the contention subchannel to declare that the AP grants the right of data transmission to the first node.

12. The method of claim 11, wherein the contending for the right of data transmission by the first node further comprises:
- before performing the sending of the RTS, sensing the contention subchannel to determine whether the contention subchannel has been idle for a pre-determined value of distributed-coordination-function inter-frame space (DIFS) so as to determine whether or not to immediately send out the RTS over the contention subchannel;
- responsive to sensing that the contention subchannel has not been idle for the DIFS, re-performing the sensing of the contention subchannel after a backoff duration determined according to a binary exponential backoff (BEB) algorithm; and
- responsive to sensing that the contention subchannel has been idle for the DIFS, performing the sending of the RTS.

13. The method of claim 9, further comprising:
- when data transmission from the first node to the AP completes, broadcasting, by the AP, an ACK to all the nodes so as to inform each of the nodes to perform the dequeuing of the node ID of the first node from the CQ buffer thereof.

14. The method of claim 9, further comprising:
- when the AP detects that the CQ buffers of all the nodes and the AP are not synchronized, broadcasting, by the AP, the CQ buffer of the AP to the nodes so as to resynchronize the CQ buffers of all the nodes with the CQ buffer of the AP.

* * * * *